US012060626B2

(12) United States Patent
Coletti et al.

(10) Patent No.: US 12,060,626 B2
(45) Date of Patent: Aug. 13, 2024

(54) CO-PRODUCTION OF LEAD AND TIN PRODUCTS

(71) Applicant: METALLO BELGIUM, Beerse (BE)

(72) Inventors: Bert Coletti, Beerse (BE); Yves De Visscher, Beerse (BE); Charles Geenen, Beerse (BE); Jan Dirk A. Goris, Beerse (BE); Koen Govaerts, Beerse (BE); Pelle Lemmens, Beerse (BE); Kris Mannaerts, Beerse (BE)

(73) Assignee: Metallo Belgium, Beerse (BE)

( * ) Notice: Subject to any disclaimer, the term of this patent is extended or adjusted under 35 U.S.C. 154(b) by 211 days.

(21) Appl. No.: 17/423,465

(22) PCT Filed: Jan. 30, 2020

(86) PCT No.: PCT/EP2020/052226
§ 371 (c)(1),
(2) Date: Jul. 15, 2021

(87) PCT Pub. No.: WO2020/157168
PCT Pub. Date: Aug. 6, 2020

(65) Prior Publication Data
US 2022/0064760 A1    Mar. 3, 2022

(30) Foreign Application Priority Data
Jan. 30, 2019    (EP) .................................... 19154614

(51) Int. Cl.
*C22C 3/00*    (2006.01)
*B23K 35/26*    (2006.01)
(Continued)

(52) U.S. Cl.
CPC ............ *C22C 3/005* (2013.01); *B23K 35/262* (2013.01); *B23K 35/268* (2013.01); *C22C 11/10* (2013.01); *C22C 13/00* (2013.01); *C22C 30/04* (2013.01)

(58) Field of Classification Search
CPC ......... C22C 3/005; C22C 11/00; C22C 11/10; C22C 13/00; C22C 30/04; C22C 13/02;
(Continued)

(56) References Cited

U.S. PATENT DOCUMENTS 1,573,830 A    2/1926   Harris
1,674,642 A    6/1928   Harris
(Continued)

FOREIGN PATENT DOCUMENTS

CN    101570826 A    11/2009
CN    101570827 A    11/2009
(Continued)

OTHER PUBLICATIONS

Jia, Guo-Bin, et al., "Deeply Removing Lead from Pb-Sn Alloy with Vacuum Distillation," Transactions of Nonferrous Metals Society of China: English Edition 23(6), 1822-1831, Jun. 2013.
(Continued)

*Primary Examiner* — Alexandra M Moore
(74) *Attorney, Agent, or Firm* — Christensen O'Connor Johnson Kindness PLLC

(57) ABSTRACT

Metal compositions and production processes are described. A process for the production of a metal composition includes a first distillation step separating off by evaporation primarily lead from a solder mixture of lead, tin, and antimony, thereby producing as a first concentrated lead stream. The process includes a second distillation step separating primarily lead and antimony from the metal composition, thereby producing a second concentrated lead stream and a
(Continued)

second bottom product. The method also includes a third distillation step separating primarily lead and antimony from the second concentrated lead stream, thereby producing a third concentrated lead stream and a third bottom product.

16 Claims, 1 Drawing Sheet

(51) Int. Cl.
  *C22C 11/10* (2006.01)
  *C22C 13/00* (2006.01)
  *C22C 30/04* (2006.01)
(58) Field of Classification Search
  CPC ..... B23K 35/262; B23K 35/268; Y02P 10/20; C22B 9/04; C22B 25/08
  See application file for complete search history.

(56) References Cited

U.S. PATENT DOCUMENTS

| | | |
|---|---|---|
| 1,779,272 A | 10/1930 | Charles et al. |
| 6,066,402 A | 8/2000 | McAndrew |

FOREIGN PATENT DOCUMENTS

| | | |
|---|---|---|
| CN | 101696475 A | 4/2010 |
| CN | 102352443 A | 2/2012 |
| CN | 104141152 A | 11/2014 |
| CN | 104593614 A | 5/2015 |
| CN | 104651625 A | 5/2015 |
| CN | 109014652 A | 12/2018 |
| CN | 102492861 A | 6/2021 |
| IN | 104651625 A | 5/2015 |
| JP | 51-54056 A | 5/1976 |
| WO | 2018/060202 A1 | 4/2018 |

OTHER PUBLICATIONS

Yang, Bin, et al., "Recycling of Metals from Waste Sn-Based alloys by vacuum separation," Transactions of Nonferrous Metal Society of China, Elsevier Science Press, vol. 25, pp. 1315-1324, 2015.
International Search Report dated Mar. 11, 2020 issued in corresponding International Application No. PCT/EP2020/052226 filed Jan. 30, 2020 (3 pages).
Written Opinion dated Mar. 11, 2020 issued in corresponding International Application No. PCT/EP2020/052226 filed Jan. 30, 2020 (6 pages).
English Translation of the First Chinese Office Action dated Jul. 21, 2022, issued in corresponding Chinese Application No. 202080009414. 4, filed on Jan. 30, 2020, 13 pages.

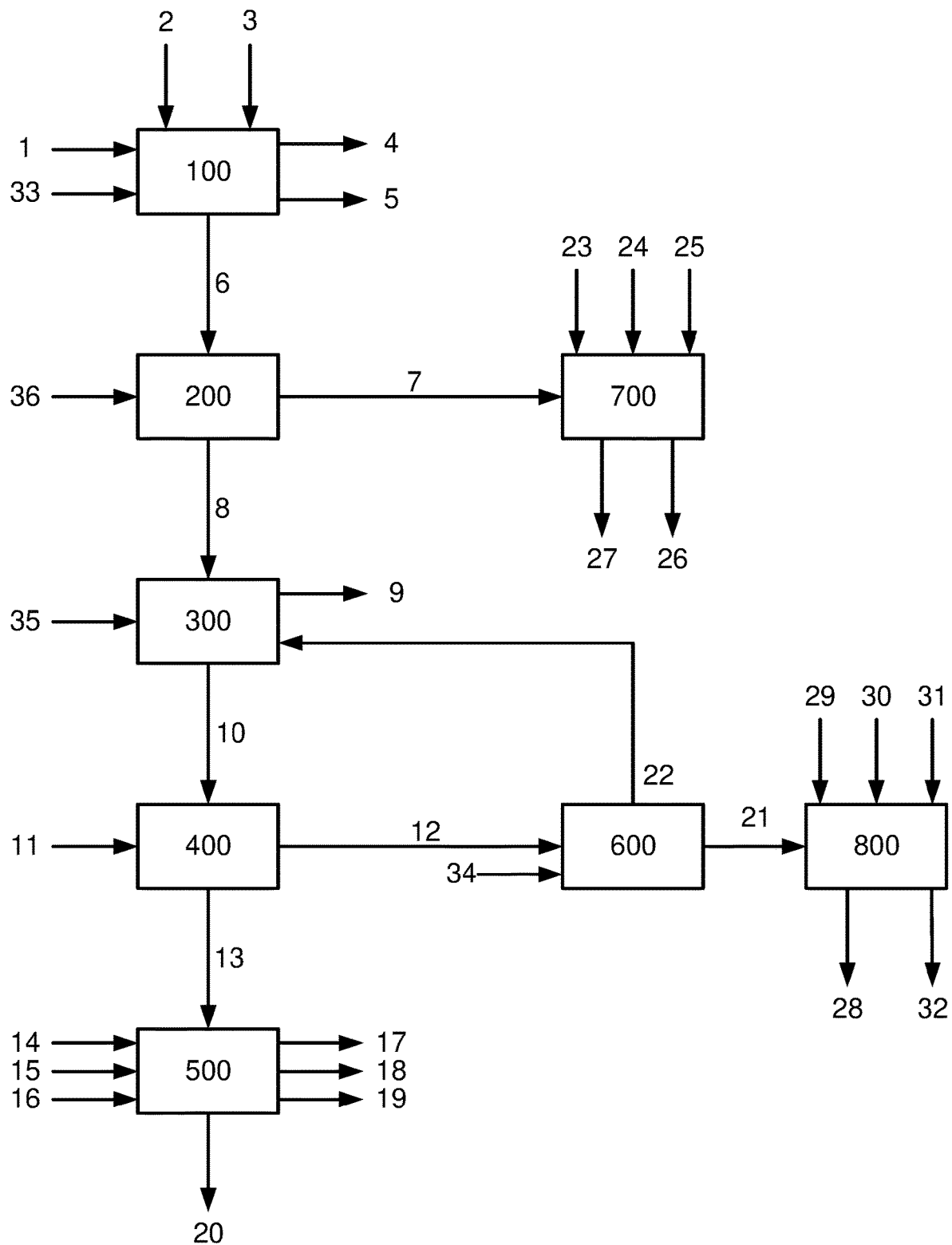

CO-PRODUCTION OF LEAD AND TIN PRODUCTS

CROSS-REFERENCES TO RELATED APPLICATIONS

This application is a national phase entry of and claims priority to international patent application PCT/EP2020/052226, entitled "IMPROVED CO-PRODUCTION OF LEAD AND TIN PRODUCTS," filed on Jan. 30, 2020, and further claims priority to European patent application EP19154614.2, entitled "IMPROVED CO-PRODUCTION OF LEAD AND TIN PRODUCTS," filed on Jan. 30, 2019, the contents of both of which are hereby incorporated by reference in their entirety.

FIELD OF THE INVENTION

The present invention relates to the production by pyrometallurgy of non-ferrous metals, in particular lead (Pb) and tin (Sn) and possibly in combination with the production of copper (Cu), from primary sources and/or secondary feedstocks. More particularly the present invention relates to the production and recovery of high purity lead products and high purity tin product from a mixture containing primarily lead and tin.

BACKGROUND OF THE INVENTION

The metal lead represents a major non-ferrous commodity in modern industry, as it has been from antiquity. The lead market of today is primarily dependent on its use in the lead storage battery, and principally the lead-acid battery. The consumption of lead in other use areas, including lead sheet for construction, lead as a barrier for radiation, as deadweight, as protection for underwater cabling, as ammunition and as an alloy metal in brass, is dwarfed by its consumption in the automotive industry.

The winning of lead dates back as far as 5000 B.C. to the ancient Egyptians, for centuries from primary feedstocks, most importantly from galena (lead sulphide—PbS). Lead-rich minerals frequently occur together with other metals, particularly silver, zinc, copper, and sometimes gold. In modern society, lead has also become the most recycled of all commonly used metals. Also in secondary feedstocks, lead is also often present in combination with other metals. For instance, the lead present in the soldering materials is accompanied by significant amounts of other metals, primarily tin, and hard lead may contain readily up to 18% wt of other metals, most commonly antimony. The recovery of high purity lead products from primary and secondary feedstocks therefore requires the separation of lead from other metals and the refining of lead or of a mixture of lead with other non-ferrous metals in order to obtain a high purity lead prime product.

Also tin is a valuable non-ferrous metal. Many end-uses of tin are sensitive to contaminants, and require a high purity tin quality. This for instance applies for the preparation of high-grade lead-free solder, in the manufacture of semiconductor compounds such as tin nitride, antimony telluride, tin arsenide and superconductor alloys.

In particular silver is undesired as a contaminant of tin metal. Significant presence of silver in tin metal deteriorates the mechanical properties of tin metal. Silver presence in tin that is used in tin plating of steel further generates the risk for the occurrence of galvanic corrosion, whereby the wall of the tin can would be corroding from the inside to the outside surface. This represents a major problem for tin cans to be used in the food industry.

One of the objectives in the production of a high purity tin product is the removal of significant amounts of primarily lead, and to some extent smaller amounts of antimony, from the prime tin product.

Guo-Bin Jia et al, "Deeply removing lead from Pb—Sn alloy with vacuum distillation", in Transactions of Nonferrous Metals Society of China, English edition, Vol. 23, No. 6, 1 Jun. 2013, pages 1822-1831, is concerned with the deep removal of lead from tin by vacuum distillation in order to obtain lead free solder, as an alternative to the traditional method for this separation including electrolysis and crystallization. The document first describes small-scale vacuum distillation experiments in batch on a crude lead having a lead content of 77.99 wt % and on a crude tin containing 12.21 wt % of lead. The raw materials contained respectively 0.0386 wt % and 0.3384 wt % of antimony and further contained small amounts of Cu, Bi, As, Fe and Ag. Reported are the evolution of lead and tin content in the volatile components and in the residue components obtained after 20, 40, 60 and 80 minutes of vacuum distillation at 4 different temperatures ranging from 900° C. to 1100° C. Also described are continuous industrialized experiments, also at the Kunming University and presumably starting from the same raw materials. The crude lead was separated in a more than 99.5% purity overhead lead product containing about 0.05% tin. The residue containing 8% of lead and around 91% of tin was stated to be suitable for being mixed with crude tin material and purified with another distillation. The lead in the crude tin could not be removed from 12.21% to 0.01% directly in one distillation and was therefore distilled two times. In a first distillation of these two lead in the crude tin could be reduced to 0.2% by distilling off a volatile component that contained 10-12% of tin and around 88% of lead. The amount of volatile component was however very small and the by-product was considered suitable for being mixed with crude lead for further refining. The residue from that first distillation was submitted to the second distillation of the two during which the lead in the tin was removed to less than 0.01%. The composition of the volatile component from this second distillation was stated to be 70% Pb and 30% Sn. Also this by-product was considered suitable for being mixed with the crude lead material for further refining. Based on the experimental results, the document proposes a 3-step vacuum distillation sequence, each further distillation step treating the residue obtained from the previous step, for separating a crude lead material of 80%/20% Pb/Sn into a >99% Pb crude lead product as the first step overhead, and a >99.5% refined tin containing <0.01% Pb as the $3^{rd}$ step residue. The overhead by-products from the second and third distillation step should be recycled and mixed with the crude lead raw material that is fed to the first distillation step. The document is not describing, nor concerned with, the fate of any of the other feed components, including antimony.

CN102492861 discloses a process for the production of refined tin from crude tin from a number of different origins comprising at least 83.80% wt and up to 96% wt Sn, which process comprises a sequence of two vacuum distillation steps in series, wherein an overhead product of the first distillation was subjected to a second vacuum distillation step in order to recover most of the entrained tin in the secondary crude tin bottom product from the second vacuum distillation step, which secondary crude tin was recycled to the first vacuum distillation step. The process also produced a lead-antimony alloy as the overhead product from the second vacuum distillation step, and by a vacuum treatment also a crude arsenic by-product containing 91-99% wt As. The crude tin feed was prior to the first vacuum distillation subjected to a centrifuge step in which the iron content was reduced and a sulphur addition step for removing copper. The refined tin obtained as the bottom product from the first vacuum distillation step was further refined to the at least 99.95% wt purity required by industry standard GB/T 728-2010, by treating the refined tin with aluminium for further reducing the traces of arsenic and antimony, and removing the residual aluminium in a subsequent step.

CN101570826 discloses a process for separating lead from tin by three vacuum distillation steps in series, each downstream step performed on the bottom product from the upstream step. The document is focussing only on the separation between Pb and Sn and on targeting a refined tin containing at most 0.005% wt of lead. The document does not give any details about the nature of the small amount of "others", nor where these are ending up. In each step an amount of so-called "scum" is separated off, of which again no details are disclosed.

CN101570827 is also concerned with separating Pb from Sn, now in the presence of an amount of antimony (Sb). In the disclosed 2-stage vacuum distillation process again the bottom of the first stage is distilled again in the second stage to obtain as final bottom product a crude tin containing 99+% Sn, while the so-called tin-lead-antimony alloy obtained as overhead in the second stage is returned to the first stage. Also this document appears only concerned with obtaining a high purity of the tin product and with obtaining high metal recoveries in each stage and overall over the two-stage process.

Also CN104651625 describes 2 and 3-stage vacuum distillation processes, whereby in the last stage the overhead or overheads from the preceding stages are redistilled. The last stage overhead condenser in each process is split into 2 sections, operating at different temperatures and leading to 2 different overhead products, the first and hottest condensate still contains Sn and is recycled to the last distillation stage, while the second and coldest condensate is significantly lower in Sn content and is removed as Pb—Sb alloy.

The above documents are addressing separation problems that are strongly simplified as compared to the problems associated with the recovery of non-ferrous metals from secondary feedstocks, in particular as part of the recovery of other non-ferrous metal in co-production with copper. In this particular industry the variety of feedstocks is enormous and the availability of individual feedstock sources may vary rapidly and widely. The processes disclosed above do not offer the flexibility that is required in this industry in order to produce prime products of which the quality is sufficiently high but also fairly constant over time. There therefore remains the need for a process with improved flexibility towards feedstock allowability relative to the processes described above.

WO 2018/060202 A1 discloses the vacuum distillation of a solder type feedstock into a lead stream overhead and a tin stream as bottom product, including the pre-treatment of the solder type feedstock to remove contaminants that could be disturbing the downstream vacuum distillation. The overhead product is stated to be further refined using conventional means to form a prime and high purity "soft lead" product, without providing further details. The bottom product is stated to be suitable for further upgrade into commercially important amounts of several of the metals present, in particular the tin, the antimony and the remaining lead, but possibly including other metal values such as silver (Ag).

WO 2018/060202 A1 does not provide any details about how that is performed. This document is concerned with the operability of a vacuum distillation step in which lead is evaporated from a solder type feedstock. It is not addressing the problem of the widely varying feedstock availabilities in the non-ferrous metal recovery industry.

The present invention aims to obviate or at least mitigate the above described problem and/or to provide improvements generally.

SUMMARY OF THE INVENTION

According to the invention, there is provided a process as defined in any of the accompanying claims.

In an embodiment, the present invention provides for a metal composition comprising, on a dry weight basis,
  at least 0.08% wt and at most 6.90% wt of lead (Pb),
  at least 0.50% wt and at most 3.80% wt of antimony (Sb),
  at least 92.00% wt and at most 98.90% wt of tin (Sn),
  at least 96.00% wt of tin, lead and antimony together,
  at least 1 ppm wt and at most 500 ppm wt of copper (Cu),
  at most 0.0500% wt of silver (Ag),
  at most 0.40% wt of arsenic (As),
  at most 0.1% of the total of chromium (Cr), manganese (Mn), vanadium (V), titanium (Ti) and tungsten (W),
  at most 0.1% of aluminium (Al),
  at most 0.1% of nickel (Ni),
  at most 0.1% of iron (Fe), and
  at most 0.1% of zinc (Zn).

In an embodiment, the present invention provides for a process for the production of a soft lead product, a hard lead product and a tin product, the process comprising
  a) providing a crude solder composition comprising primarily major amounts of lead and tin, together with a minor amount of antimony,
  b) a first distillation step separating off by evaporation primarily lead from the crude solder composition from step a), thereby producing as overhead product a first concentrated lead stream and a first bottom product enriched in tin, the first concentrated lead stream forming the basis for obtaining the soft lead product,
  c) if silver is present in the crude solder composition, optionally a fractional crystallisation step performed on the first bottom product from step b) for separating silver from tin and producing a drain product from the liquid end of the crystallisation step enriched in silver and a first tin-enriched product from the crystal end of the crystallisation step,
  d) a second distillation step separating off by evaporation primarily lead and antimony from the metal composition according to the present invention which is selected from the first tin-enriched product from step c) and the first bottom product from step b), thereby producing as overhead product a second concentrated lead stream and a second bottom product, the second bottom product forming the basis for obtaining the tin product,
  e) a third distillation step separating off by evaporation primarily lead and antimony from the second concentrated lead stream from step d), thereby producing as overhead product a third concentrated lead stream and a third bottom product, the third concentrated lead stream forming the basis for obtaining the hard lead product.

The applicants have found that the metal composition according to the present invention is highly suitable as an intermediate stream of the process according to the present invention, more particularly as the feed of the second distillation step d) for being separated, in a single distillation step in which most of the lead and antimony are removed by evaporation, resulting in a tin concentrate as residue which may readily be purified by chemical means to become a high purity tin prime product, while the overhead from the distillation step forms a distillate that is very suitable, by means of a further distillation step in step e), for deriving therefrom a hard-lead prime product, more particularly a lead product containing antimony in the range of 2-15% wt.

The applicants have found that the presence of lead in the metal composition according to the present invention, as prescribed, contributes significantly to this suitability, because in the distillation step d) as described the lead acts as a carrier for taking overhead most of the antimony. A higher lead presence in the metal composition according to the present invention therefore leads to a lower level of antimony in the bottom of the distillation step d) to which it is submitted.

The applicants have found that the same logic as for antimony applies when silver is present in the composition according to the present invention. The distillation step d) may be operated such that a major part of the silver in the feed to step d) is taken overhead and is thus removed from the bottom residue in which it is preferred that only a limited amount of silver would be present. A higher lead presence thus leads for the same reasons also for a lower level of silver in the bottom of the distillation step d) to which it is submitted.

The applicants have however found that the lead content in the metal composition according to the present invention may be kept limited, in compliance with the upper limit as specified. The applicants have found that extra lead or lead-containing feed may be mixed in with the metal composition according to the present invention to form the feed for the distillation step d). This brings the advantage that the metal composition according to the present invention may carry more tin, which is more valuable than lead, for the same volumetric processing capacity upstream in the production of the metal composition according to the present invention. This advantage therefore directly relates to a possibly enhanced economic advantage for the process operator. This argument does not remove the advantage of compliance with the lower limit as specified for lead in the composition according to the present invention, because any lead that is present does not need to be supplied by adding an extra feed to the distillation step d).

The applicants prefer to have antimony present in the metal composition according to the present invention in the range as specified. This brings the advantage that the composition is suitable as feedstock for deriving therefrom a hard lead product together with the high purity tin prime product. The target of the process according to the present invention is to produce a hard lead product as a third prime product, together with the soft lead product and the tin product. The specified minimum presence of antimony assures the capability of obtaining the hard lead product.

The applicants submit that the limits of the range specified for the presence of tin in the metal composition according to the present invention are typically a consequence of the limits that are specified for the other components, and of the optional presence of other elements that are allowable in addition thereto.

The total content of tin, lead and antimony together in the metal composition according to the present invention should be within the range as specified. The lower limit as specified reduces the possible presence of other elements, particularly elements not specified as part of the present invention, and which may be less desirable in the further processing of the metal composition and bring extra burden in deriving therefrom the target prime products. In an embodiment, the metal composition according to the present invention comprises, over and above the elements that are discussed in this document for the composition, any other element not discussed or specified at a concentration that is not more than an unintentional impurity and without influence on the technical effects that form the target of the present invention, in particular the smooth operation of the vacuum distillation step performed on the composition, and the capability of producing prime products of commercial grade quality as derivatives.

The applicants have found that silver may be present in the metal composition according to the present invention, provided its level remains limited. As discussed above in the background section, high silver levels are undesired in commercial high grade tin prime products. The applicants have found that silver may be allowed in the composition up to the upper limit as specified because silver may be made to preferably go overhead when the composition is submitted to the distillation step d) as described. The applicants have found that the levels as prescribed are acceptable because the distillation step d) may be performed such that the level of silver in the bottom residue is sufficiently low such that the tin prime product derived therefrom complies with the specifications of marketable high purity tin prime products.

The applicants have also found that the presence of arsenic, within the limits as specified, is allowable in the metal composition according to the present invention. The applicants have found that the distillation step d) may be operated to also have most of the arsenic end up in the overhead product, from which it may find its way as an acceptable minor component of the hard lead final product, together with the antimony. The applicants have found that the minor amount of arsenic which may stay with the bottom residue in the distillation step d) results in a level that may be further reduced by further refining of that stream with chemical means, as described further below in this document, to obtain the desired tin product as one of the three prime products produced by the process according to the present invention.

In addition, the metal composition according to the present invention is low in the specific elements that may form, under the operating conditions of the downstream distillation steps d) and e), solid intermetallic compounds by reactions between each other or with tin, and which could attach to the equipment and impair the distillation operations.

The metal composition according to the present invention comprises a significant but also limited amount of antimony. The prescribed amount of antimony may be allowed because this amount of antimony may readily be distilled away from the tin by arranging appropriate distillation conditions in step d) such that the antimony evaporates together with the lead, which is usually more volatile than antimony. The allowance of antimony widens the acceptance criteria for the feedstocks of the upstream processes from which the metal composition according to the present invention may be obtained.

The applicants have found that the process according to the present invention brings the advantage of being capable to accept a crude solder as feedstock that may vary widely in composition without requiring a change in the operating and/or control targets for steering and/or controlling the different process steps.

The first distillation step b) for instance may continue to fully target the evaporation, as selective as possible, of most of the incoming lead and thereby producing an overhead product having the quality required for deriving therefrom the prime soft lead product by the downstream soft lead refining steps, thereby keeping most tin and antimony from its feedstock in the first bottom product as its bottom residue. Distillation step b) may thus focus on removing by evaporation primarily lead while entraining as little as possible of antimony, silver and tin with the evaporating lead. The process sequence is capable of handling the antimony and the tin in the further distillation steps d) and e), and also the silver that may be present at a level that would contaminate the tin prime product and/or that would justify the inclusion of the optional step c) for recovering the silver in an additional by-product stream.

The second distillation step d) may continue to fully target the remaining of a tin-enriched product as its residue which is suitable for deriving therefrom the tin prime product by the downstream tin refining steps, thereby bringing most lead and antimony from its feedstock in the second concentrated lead stream as its overhead stream. The step d) may thus focus on producing a residue having the desired purity in tin. Thanks to the downstream distillation step e), the process is capable of handling whatever distillate is obtained as the overhead product from step d).

The third distillation step e) may continue to fully target the selective evaporation of antimony, and of lead when present, from its feedstock into the third concentrated lead stream as its overhead. The step e) may thus focus on producing an overhead stream containing as much as possible of the antimony, and arsenic when present, and may evaporate the amount of lead as a carrier that is necessary to obtain this operational target. The third bottom product obtained from distillation step e) is a stream that is highly suitable for being recycled at the most appropriate location in the process according to the present invention.

If present, the fractional crystallisation step may fully focus on the removal of silver from the main tin stream, such that the silver content in the ultimate tin prime product will be sufficiently low and in compliance with the customer expectations. The applicants prefer, when the level of silver in the first bottom product is at least 120 ppm by weight, that the fractional crystallisation step is included in the process according to the present invention, because they consider that the economic benefits of the extra silver enriched by-product outweigh the extra burden and operating costs of the crystallisation step, including the extra operator attention which this step requires and because this extra step facilitates that the downstream second distillation step d) more readily achieves its operational target as explained above. The applicants have found that the presence of significant amounts of lead in the optional fractional crystallization step c) is a facilitator for separating the silver into a liquid drain product, as an extra by-product from the process according to the present invention, from most of the tin that is retrieved as part of the crystal side product of the crystallization step c).

A major advantageous technical effect of the process according to the present invention is its capability for readily handling a wide range of feed stream compositions without having to change the operating targets for most of the individual steps of the process. The wide range of readily acceptable feed stream compositions results in the product according to the present invention also having a relatively wide range of acceptable compositions.

The feedstock flexibility of the process according to the present invention with respect to its solder feedstock brings the further advantage that the process steps upstream of the process according to the present invention are able to accept a wide range of raw materials.

BRIEF DESCRIPTION OF THE DRAWINGS

FIG. 1 shows a flow diagram of a larger overall process comprising a preferred embodiment of the process according to the present invention.

DETAILED DESCRIPTION

The present invention will hereinafter be described in particular embodiments, and with possible reference to particular drawings, but the invention is not limited thereto, but only by the claims. Any drawings described are only schematic and are non-limiting. In the drawings, the size of some of the elements may be exaggerated and not drawn to scale for illustrative purposes. The dimensions and the relative dimensions in the drawings do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than those described and/or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein may operate in other orientations than described or illustrated herein.

The term "comprising", as used in the claims, should not be considered as being limited to the elements that are listed in context with it. It does not exclude that there are other elements or steps. It should be considered as the presence provided of these features, integers, steps or components as required, but does not preclude the presence or addition of one or more other features, integers, steps or components, or groups thereof. Thus, the volume of "an article comprising means A and B" may not be limited to an object which is composed solely of agents A and B. It means that A and B are the only elements of interest to the subject matter in connection with the present invention. In accordance with this, the terms "comprise" or "embed" enclose also the more restrictive terms "consisting essentially of" and "consist of". By replacing "comprise" or "include" with "consist of" these terms therefore represent the basis of preferred but narrowed embodiments, which are also provided as part of the content of this document with regard to the present invention.

Unless specified otherwise, all ranges provided herein include up to and including the endpoints given, and the values of the constituents or components of the compositions are expressed in weight percent or % by weight of each ingredient in the composition.

As used herein, "weight percent,", "% wt", "wt-%," "percent by weight," "% by weight,", "ppm wt", "ppm by weight", "weight ppm" or "ppm" and variations thereof refer to the concentration of a substance as the weight of that substance divided by the total weight of the composition and multiplied by 100 or 1000000 as appropriate, unless specified differently. It is understood that, as used here, "percent," "%," are intended to be synonymous with "weight percent," "% wt," etc.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

Additionally, each compound used herein may be discussed interchangeably with respect to its chemical formula, chemical name, abbreviation, etc.

Most of the metal streams in the process according to the present invention contain a major portion of lead, often in combination with a significant amount of tin. Such streams have a relatively low melting point and have been used, already for centuries, for attaching one solid to another solid, by a process which was often called "soldering". Such streams are therefore often addressed as being so-called "solder" streams or "solders", and this term has also been used in this document to address such streams.

From the target metals which the present invention is recovering, Sn and Pb are considered "the solder metals". These metals distinguish themselves from other metals, in particular from the two other target metals copper and nickel, but also from iron, because mixtures containing major amounts of these metals usually have a much lower melting point than mixtures containing major amounts of copper and/or nickel. Such compositions have been used already millennia ago for creating a permanent bond between two metal pieces, and this by first melting the "solder", bringing it in place, and letting it solidify. The solder therefore needed to have a lower melting temperature than the metal of the pieces it was connecting. In the context of the present invention, a solder product or a solder metal composition, two terms which are used interchangeably throughout this document, mean metal compositions in which the combination of the solder metals, thus the level of Pb plus Sn, represents the major portion of the composition, i.e. at least 50% wt and preferably at least 65% wt. The solder product may further contain minor levels of the other target metals copper and/or nickel, and of non-target metals, such as Sb, As, Bi, Zn, Al and/or Fe, and/or elements such as Si.

In this document and unless specified differently, amounts of metals and oxides are expressed in accordance with the typical practice in pyrometallurgy. The presence of each metal is typically expressed in its total presence, regardless whether the metal is present in its elemental form (oxidation state=0) or in any chemically bound form, typically in an oxidized form (oxidation state >0). For the metals which may relatively easily be reduced to their elemental forms, and which may occur as molten metal in the pyrometallurgical process, it is fairly common to express their presence in terms of their elemental metal form, even when the composition of a slag or dross is given, wherein the majority of such metals may actually be present in an oxidized and/or chemically bound form. It is therefore that the composition of the metal mixture as feed to step (a) specifies the content of Fe, Zn, Pb, Cu, Sb, Bi as elemental metals. Less noble metals are more difficult to reduce under non-ferrous pyrometallurgical conditions and occur mostly in an oxidized form. These metals typically are expressed in terms of their most common oxide form. Therefore slag or dross compositions are typically giving the content of Si, Ca, Al, Na respectively expressed as $SiO_2$, $CaO$, $Al_2O_3$, $Na_2O$.

In an embodiment of the present invention, the metal composition according to the present invention comprises at least 0.09% wt or even at least 0.10% wt of lead, preferably at least 0.15% wt, more preferably at least 0.20% wt, even more preferably at least 0.50% wt, preferably at least 0.75% wt, more preferably at least 1.00% wt, even more preferably at least 1.50% wt, preferably at least 2.00% wt, more preferably at least 2.50% wt, even more preferably at least 3.00% wt, preferably at least 3.50% wt, more preferably at least 4.00% wt, even more preferably at least 4.50% wt of lead. The applicants have found that a small amount of lead is readily allowable and even desirable in the metal composition according to the present invention, because lead facilitates the evaporation of antimony in a downstream vacuum distillation step. Because of its relatively high volatility, the lead dilutes the vapour phase in the distillation step, thereby pulls more antimony from the remaining liquid, and thus acts as a kind of carrier for the antimony. The same logic as for antimony applies for silver that may be present in the composition. As a result, the lead promotes the removal of antimony and/or silver from the main tin stream and hence contributes in ultimately obtaining a higher purity tin prime product.

In an embodiment of the present invention, the metal composition according to the present invention comprises at most 6.80% wt of lead, preferably at most 6.50% wt, more preferably at most 6.00% wt, even more preferably at most 5.50% wt of lead, preferably at most 5.00% wt, more preferably at most 4.50% wt, even more preferably at most 4.00% wt of lead. With lower amounts of lead in the metal composition according to the present invention, when this is produced by a fractional crystallisation step, the applicants have found that the volume of drain by-product may be kept lower and the concentration of silver in the drain may be kept higher. This brings the advantage that silver may be recovered efficiently from more dilute feedstocks, while at the same time producing a drain that is sufficiently high in silver to allow an effective and efficient recovery of the silver thereof. The lower volume and higher silver content of the drain are also to the benefit of the efficiency and effectiveness of the process steps for the recovery of the silver from the drain.

A further advantage of respecting the upper limit on the presence of lead in the composition according to the present invention, is that more room is left in the same amount of composition for processing a higher volume of tin through the same equipment. Because the economic value upgrade of tin into a prime product is higher than this of lead, limiting the lead in the composition provides a capability for an enhanced profitability on the tin production. The applicants have found, if even more lead is nevertheless desired in the second distillation taking as part of its feed the metal composition according to the present invention, that it may be preferred to add lead or a suitable lead-containing fresh feed into the feed of the distillation directly, rather than insisting on having more lead in the composition according to the present invention, because of the possible downside it may cause on the tin production.

In an embodiment of the present invention, the metal composition according to the present invention comprises at least 0.75% wt, preferably at least 1.25% wt, more preferably at least 1.50% wt, preferably at least 1.75% wt, more preferably at least 1.80% wt, even more preferably at least 1.90% wt, preferably at least 1.95% wt, more preferably at least 2.00% wt, even more preferably at least 2.10% wt of antimony. Optionally the metal composition comprises at most 3.70% wt of antimony, preferably at most 3.50% wt, more preferably at most 3.20% wt, even more preferably at most 3.00% wt, preferably at most 2.75% wt, more preferably at most 2.50% wt, even more preferably at most 2.25% wt, preferably at most 2.15% wt, more preferably at most 2.10% wt, even more preferably at most 2.00% wt of antimony. The applicants have found that such an amount of antimony is readily allowable in the metal composition, because the antimony may be made to evaporate in a downstream vacuum distillation step, and ultimately a high purity tin prime product may readily be obtained, while from the overhead of this distillation step may be obtained a valuable hard lead prime product.

In an embodiment of the present invention, the metal composition according to the present invention comprises at least 92.50% wt of tin, preferably at least 93.00% wt, more preferably at least 93.50% wt, even more preferably at least 94.00% wt, preferably at least 94.50% wt, more preferably at least 95.00% wt, even more preferably at least preferably at least 96.00% wt, more preferably at least 96.50% wt, even more preferably at least 97.00% wt. This brings the benefit of a higher yield of high purity tin prime product if the metal composition according to the present invention is further processed by distillation in order to remove more volatile components such as lead and antimony, and refining the second bottom product obtained from that distillation step into a tin prime product. Optionally the metal composition according to the present invention comprises at most 98.80% wt or tin, preferably at most 98.70% wt, more preferably at most 98.50% wt, even more preferably at most 98.25% wt, preferably at most 98.00% wt, more preferably at most 97.50% wt, even more preferably at most 97.25% wt, preferably at most 97.00% wt, more preferably at most 96.50% wt, even more preferably at most 96.25% wt, preferably at most 96.00% wt, more preferably at most 95.75% wt, even more preferably at most 95.50% wt, preferably at most 95.25% wt, more preferably at most 95.00% wt, even more preferably at most 94.50% wt preferably at most 94.00% wt, more preferably at most 93.50% wt, even more preferably at most 93.00% wt of tin. The applicants have found that materials with less tin content are more readily available and from a wider variety of sources, hence at more attractive conditions. A lower tin requirement in the metal composition according to the present invention thus brings the advantage of offering a wider feedstock flexibility for the process producing the composition.

In an embodiment, the metal composition according to the present invention comprises at least 96.25% wt of tin, lead and antimony together, preferably at least 96.50% wt, more preferably at least 96.75% wt, even more preferably at least 97.00% wt, yet more preferably at least 97.25% wt, preferably at least 97.50% wt, more preferably at least 97.75% wt, even more preferably at least 98.00% wt, yet more preferably at least 98.25% wt, preferably at least 98.50% wt, more preferably at least 98.75% wt, even more preferably at least 98.90% wt, yet more preferably at least 99.00% wt of tin, lead and antimony together. Optionally, the metal composition according to the present invention comprises at most 99.95% wt of tin, lead and antimony together, preferably at most 99.75% wt, more preferably at most 99.50% wt, even more preferably at most 99.25% wt, yet more preferably at most 99.00% wt, preferably at most 98.75% wt, more preferably at most 98.50% wt, even more preferably at most 98.25% wt, yet more preferably at most 98.00% wt, preferably at most 97.75% wt, more preferably at most 97.50% wt, even more preferably at most 97.25% wt, yet more preferably at most 97.00% wt of tin, lead and antimony together. The applicants prefer to have the total of tin, lead and antimony in the composition to be above the lower limit as specified, because this implies that the presence of other elements is lower. A few exceptions excluded, most of these other elements are undesired at levels above unintentional contaminants, and if too prominent, may bring extra burden in the processing of the metal composition according to the present invention, or value loss for at least one of the prime products derived therefrom.

The applicants allow that the total of tin, lead and antimony does not necessarily represent a full 100% of the composition according to the present invention, because some other elements are also acceptable, usually at limited levels, as discussed elsewhere in this document.

The applicants point out that the effects obtained by the present invention are related to the separation by distillation of the metal composition according to the present invention, and to the derivation thereby of higher purity prime products by pyrometallurgical means. Only the elements known to be able to make impact on these effects should therefore be discussed and may, if appropriate, be taken into account when defining the present invention.

In an embodiment, the metal composition according to the present invention comprises at most 0.0450% wt of silver, preferably at most 0.0400% wt, more preferably at most 0.0350% wt, even more preferably at most 0.0300% wt, yet more preferably at most 0.0250% wt, preferably at most 0.0200% wt, more preferably at most 0.0175% wt, even more preferably at most 0.0150% wt, yet more preferably at most 0.0125% wt of silver. Silver is undesired as a contaminant in commercial high grade tin products, for reasons discussed elsewhere in this document. The applicants have found that it is therefore better to limit the presence in the metal composition according to the present invention to the upper limit as specified, because this facilitates the process for obtaining a high grade tin prime product as a derivative.

In an embodiment, the metal composition according to the present invention comprises at most 0.35% wt of arsenic, preferably at most 0.30% wt, more preferably at most 0.250% wt, even more preferably at most 0.200% wt, yet more preferably at most 0.175% wt, preferably at most 0.150% wt, more preferably at most 0.125% wt, even more preferably at most 0.100% wt, yet more preferably at most 0.075% wt of arsenic. Because some of the arsenic in the metal composition according to the present invention is likely to end up in the tin-rich stream downstream that is being refined into a prime product, the applicants prefer to limit the presence of arsenic in the metal composition according to the present invention as specified. The applicants have however found that some arsenic may be allowed in the metal composition according to the present invention because of the downstream processing. This brings the advantage that upstream processes may accept feed streams containing arsenic. The applicants therefore prefer that the metal composition according to the present invention comprises at least 0.0001% wt of arsenic, preferably at least 0.0010% wt, more preferably at least 0.0050% wt, even more preferably at least 0.0100% wt, yet more preferably at least 0.0150% wt, preferably at least 0.0200% wt, more preferably at least 0.0250% wt, even more preferably at least 0.0300% wt, yet more preferably at least 0.0350% wt, preferably at least 0.040% wt, more preferably at least 0.045% wt, even more preferably at least 0.050% wt, yet more preferably at least 0.055% wt of arsenic. The applicants have found that the downstream process as described in this document for the metal composition according to the present invention is readily capable of coping with the amounts of arsenic as specified. This capability brings the advantage that the process producing the metal composition according to the present invention is allowed to accept feedstocks containing arsenic.

The inventors have found that in particular chromium (Cr), manganese (Mn), vanadium (V), titanium (Ti), tungsten (W), copper (Cu), nickel (Ni), iron (Fe), zinc (Zn) and aluminium (Al), are metals of which the presence in the feed to a vacuum distillation step may lead to the disturbing intermetallic compounds during the vacuum distillation. Of these potentially disturbing metals, it are Cu, Ni, Fe, Zn and/or Al which are typically more important for being controlled. The reason for this is that it is more advantageous to recover tin and/or lead from feedstocks that contain Cu, Ni, Fe, Zn and/or Al. Iron and/or aluminium may also be introduced for process reasons into the overall process upstream of the tin and/or lead recovery step. The presence of Cu, Ni, Fe, Zn and/or Al in the intermediate product from which one wants to recover the tin and/or lead is therefore more likely and is the result of choices in the upstream process steps and of the selection of the feedstock materials for the upstream process steps, typically of a pyrometallurgical nature.

The inventors have found that the identified problems may significantly be alleviated and even may be avoided by controlling within particular levels the concentration of these metals in the feed to the distillation step wherein the feed is separated into more concentrated streams by evaporation of at least part of the lead.

The inventors have further found that these possibly harmful metals, and in particular copper, do not need to be banned entirely from the distillation feed in order to make the feed suitable for vacuum distillation. The inventors have for instance found that the identified problems may be reduced to a practically and economically acceptable level when small amounts of copper remain present in the feed to the distillation step. This finding brings the advantage that feed streams may be processed which occur as the by-product from the recovery of copper from primary and/or secondary feedstocks, in particular from secondary feedstocks, even more importantly from feedstocks containing end-of-life materials.

In an embodiment the metal composition according to the present invention comprises at least 2 ppm wt of copper, more preferably at least 3 ppm wt, even more preferably at least 4 ppm wt, yet more preferably at least 5 ppm wt of copper, preferably at least 6 ppm wt, more preferably at least 7 ppm wt, even more preferably at least 8 ppm wt, yet more preferably at least 9 ppm wt of copper, preferably at least 10 ppm wt, more preferably at least 12 ppm wt, even more preferably at least 14 ppm wt, yet more preferably at least 15 ppm wt of copper, preferably at least 16 ppm wt, more preferably at least 18 ppm wt and even more preferably at least 20 ppm wt of copper. The applicants have found that the here specified amounts of copper may be left in the metal composition according to the present invention without destroying the usefulness of the metal composition according to the present invention as feed stream for the vacuum distillation step, hence without significantly reducing or destroying the effect which is obtained, i.e. increasing the risk that a vacuum distillation step performed on the metal composition according to the present invention would not anymore be able to operate in continuous mode over an extended period of time without encountering problems of intermetallic compounds comprising copper which impair the distillation operations. The applicants have found that the identified problems may be reduced to a practically and economically acceptable level when the small amounts of copper, as specified, remain present in the metal composition according to the present invention when used as feed to the distillation step.

The higher level of allowed copper in the metal composition according to the present invention, as specified above, also brings the advantage that the upstream processes from which the feed stream of the process of the present invention is derived enjoy an increased freedom of operation. These processes may even possibly be concerned with the pyrometallurgical recovery of copper metal. The processes which produce a by-product according to the metal composition according to the present invention may recover prime metals such as tin and/or lead from a much wider variety of possible raw materials, primary as well as secondary, and including end-of-life metal-containing materials.

In an embodiment the metal composition according to the present invention comprises at most 450 ppm wt of copper, preferably at most 400 ppm wt, more preferably at most 350 ppm wt, even more preferably at most 300 ppm wt, yet more preferably at most 250 ppm wt, preferably at most 200 ppm wt, more preferably at most 150 ppm wt, even more preferably at most 125 ppm wt, yet more preferably at most 100 ppm wt, preferably at most 80 ppm wt, more preferably at most 60 ppm wt, even more preferably at most 40 ppm wt, yet more preferably at most 20 ppm wt, preferably at most 15 ppm wt, more preferably at most 10 ppm wt, even more preferably at most 7 ppm wt of copper. The applicants have found that the lower the concentration of copper in the metal composition according to the present invention, the lower the risk for the formation of intermetallic compounds when the metal composition according to the present invention is subjected to vacuum distillation for removing at least part of the lead and antimony in the composition by evaporation. The applicants have further found that the lower the copper presence in the metal composition according to the present invention, the lower the concentration of copper in the product streams from the downstream vacuum distillation. This reduces the burden in the further removal of copper from these streams on their path towards becoming prime products, in particular in terms of chemicals consumption and in terms of amounts of by-products formed, which preferably are recycled upstream of the process in accordance of the present invention, and hence also in terms of reducing the potentially damaging effects of these chemicals in this recycle operation, such as by attacking the refractory material in a pyrometallurgical process step.

In an embodiment, the metal composition according to the present invention comprises at most 0.10% wt of the total of chromium (Cr), manganese (Mn), vanadium (V), titanium (Ti) and tungsten (W) together, preferably at most 0.010% wt, more preferably at most 0.005% wt, even more preferably at most 0.0010% wt, preferably at most 0.0005% wt, more preferably at most 0.0001% wt of chromium (Cr), manganese (Mn), vanadium (V), titanium (Ti) and tungsten (W) together. The applicants have found that the risk for the formation of potentially disturbing intermetallic compounds is reduced by controlling the presence of these compounds below lower levels.

In an embodiment, the metal composition according to the present invention comprises at least 0.0001% wt of the total of chromium (Cr), manganese (Mn), vanadium (V), titanium (Ti) and tungsten (W) together, preferably at least 0.0005% wt, more preferably at least 0.0010% wt, even more preferably at least 0.0020% wt, preferably at least 0.0030% wt, more preferably at least 0.0050% wt, even more preferably at least 0.010% wt of the total of chromium (Cr), manganese (Mn), vanadium (V), titanium (Ti) and tungsten (W) together. The applicants have found that it is not essential, for obtaining a satisfactory distillation operation, to remove these compounds down to very low levels, such as below their detection limit of about 1 ppm wt. The applicants have on the other hand also found that the removal of these compounds down to the very low levels requires significant extra efforts, process steps, chemicals and attention, and that the extra gain in the distillation operation does not justify the extent of these extras. The applicants have found that it is therefore beneficial to control the presence of these compounds within two measurable limits, as specified above.

In an embodiment the metal composition according to the present invention comprises at most 0.10% wt of zinc (Zn), preferably at most 0.010% wt, more preferably at most 0.0050% wt, even more preferably at most 0.0010% wt, preferably at most 0.0005% wt, more preferably at most 0.0001% wt of zinc. The applicants have found that a vacuum distillation performed on the metal composition according to the present invention may be particularly sensitive to the presence of zinc. Zinc is in the first place capable of forming intermetallic compounds, and hence contributes to the problem as discussed. Zinc is also a rather volatile metal and any zinc present may also at least partially become part of the vapour phase inside the distillation equipment. The heating in the distillation equipment is very often provided electrically, by sending an electric current through heating electrodes inside the distillation equipment. The applicants have found that a control of the presence of zinc within the prescribed limits reduces the risk for electric arcs occurring between two points of these heating electrodes which may be located close to each other and between which there is a voltage difference. Such electric arcs represent a short in the electrical circuit of the heating installation, and are often a cause of immediate equipment shutdown. In case of absence or malfunction of fuses, they may cause damage to the transformer and AC/DC converter in the electrical system. The arcs are damaging and possibly destroying the electrodes, and may in addition also burn through the furnace wall, in particular when drawn between an electrode and the furnace wall.

In an embodiment the metal composition according to the present invention comprises at least 0.0001% wt of zinc (Zn), preferably at least 0.0005% wt, more preferably at least 0.0010% wt, even more preferably at least 0.0050% wt, preferably at least 0.010% wt, more preferably at least 0.050% wt of zinc. The applicants have found that it is not necessary to remove zinc down to excessively low levels in order to sufficiently alleviate the problems which zinc may cause during the vacuum distillation of the metal composition according to the present invention. The applicants have found that small amounts of zinc, as specified, may therefore be left in the metal composition as feed for a vacuum distillation. The applicants have found that with the specified limits, the desired low levels of zinc in the prime end-products may readily be reached.

In an embodiment the metal composition according to the present invention comprises at most 0.10% wt of nickel (Ni), preferably at most 0.050% wt, more preferably at most 0.010% wt, preferably at most 0.0050% wt, more preferably at most 0.0010% wt of nickel (Ni). Nickel is a metal which is present in many raw materials available for the recovery of non-ferrous metals, in particular in secondary raw materials, and especially in end-of-life materials. It is thus important in the recovery of non-ferrous metals that the process is capable of coping with the presence of nickel. Furthermore, the pyrometallurgical processes for recovering non-ferrous metals often consume significant amounts of iron as a process chemical. It is advantageous to be able to use secondary iron-containing materials for this purpose. These materials may besides high amounts of iron also contain minor amounts of nickel. It is advantageous to be able to also cope with these kinds of process chemicals. Nickel is however also a metal which may form intermetallic compounds during vacuum distillation. The applicants have found that a control within the specified limits of the amount of nickel present in the metal composition according to the present invention is able to sufficiently reduce the risk for the formation of nickel-containing intermetallic compounds during vacuum distillation of the metal composition. The applicants have further found that it is preferred to bring the nickel content in the feed to the vacuum distillation step down, rather than removing larger amounts of nickel downstream in the process. Such downstream nickel removal is typically performed together with removing arsenic (As) and/or antimony (Sb), and carry a risk for generating the very toxic gasses arsine ($AsH_3$) and/or Stibine ($SbH_3$). The nickel removal down to within the specified limits therefore also reduces the downstream risk for the generation of toxic gasses, and is thus also a safety and industrial hygiene measure.

In an embodiment the metal composition according to the present invention comprises at least 0.0005% wt of nickel (Ni), preferably at least 0.0010% wt, more preferably at least 0.0050% wt, preferably at least 0.010% wt, more preferably at least 0.050% wt of nickel (Ni). The applicants have found that it is not essential to remove nickel down to very low levels, such as below the detection limit of 1 ppm wt. The applicants have found that a control within the specified limits of the amount of nickel present in the metal composition according to the present invention is able to sufficiently reduce the risk for the formation of nickel-containing intermetallic compounds during vacuum distillation of the metal composition according to the present invention, as well as avoiding an increased safety and industrial hygiene risk downstream associated with possible arsine and/or stibine gas generation, while avoiding unnecessary efforts in the clean-up of the metal composition according to the present invention in its preparation as feed for a vacuum distillation.

In an embodiment the metal composition according to the present invention comprises at most 0.10% wt of iron (Fe), preferably at most 0.070% wt, more preferably at most 0.050% wt, even more preferably at most 0.010% wt, preferably at most 0.0050% wt, more preferably at most 0.0040% wt, even more preferably at most 0.0030% wt of iron. Iron is a metal which is present in many raw materials available for the recovery of non-ferrous metals, in particular in secondary raw materials, and especially in end-of-life materials. Furthermore, the pyrometallurgical processes for recovering non-ferrous metals often consume significant amounts of iron as a process chemical. Iron is a metal which may form intermetallic compounds during vacuum distillation. The applicants have found that a control within the specified limits of the amount of iron present in the metal composition according to the present invention is able to sufficiently reduce the risk for the formation of iron-containing intermetallic compounds during vacuum distillation of the metal composition.

In an embodiment the metal composition according to the present invention comprises at least 0.0001% wt of iron (Fe), preferably at least 0.0002% wt, more preferably at least 0.0003% wt, even more preferably at least 0.0005% wt, preferably at least 0.0010% wt, more preferably at least 0.0015% wt, even more preferably at least 0.0020% wt of iron. the applicants have found that it is not essential to remove iron down to very low levels, such as below the detection limit of 1 ppm wt. The applicants have found that a control within the specified limits of the amount of iron present in the metal composition according to the present invention is able to sufficiently reduce the risk for the formation of iron-containing intermetallic compounds during vacuum distillation of the metal composition, while avoiding unnecessary efforts in the clean-up of the metal composition according to the present invention in its preparation as feed for a vacuum distillation.

In an embodiment the metal composition according to the present invention comprises at most 0.10% wt of aluminium (Al), preferably at most 0.050% wt, more preferably at most 0.010% wt, even more preferably at most 0.0050% wt, yet more preferably at most 0.0010% wt, preferably at most 0.0005% wt, more preferably at most 0.0001% wt of aluminium. Aluminium is a metal which is present in many raw materials available for the recovery of non-ferrous metals, in particular in secondary raw materials, and especially in end-of-life materials, such as waste beverage cans. Furthermore, the pyrometallurgical processes for recovering non-ferrous metals may use aluminium as a process chemical, such as aluminium granulate, for the removal of copper from solder-type liquid metal streams. Aluminium is a metal which may form intermetallic compounds during vacuum distillation. The applicants have found that a control within the specified limits of the amount of aluminium present in the metal composition according to the present invention is able to sufficiently reduce the risk for the formation of aluminium-containing intermetallic compounds during vacuum distillation of the metal composition according to the present invention.

In an embodiment the metal composition according to the present invention comprises at least 0.0001% wt of aluminium (Al), preferably at least 0.0002% wt, more preferably at least 0.0003% wt, even more preferably at least 0.0005% wt, preferably at least 0.0010% wt, more preferably at least 0.0015% wt, even more preferably at least 0.0020% wt of aluminium. The applicants have found that it is not essential to remove aluminium down to very low levels, such as below the detection limit of 1 ppm wt. The applicants have found that a control within the specified limits of the amount of aluminium present in the metal composition according to the present invention is able to sufficiently reduce the risk for the formation of aluminium-containing intermetallic compounds during vacuum distillation of the metal composition according to the present invention, while avoiding unnecessary efforts in the clean-up of the metal composition according to the present invention in its preparation as feed for a vacuum distillation.

In an embodiment, the metal composition according to the present invention is a molten liquid. The present invention is concerned with the behaviour of the metal composition according to the present invention as a molten liquid in the pyrometallurgical steps of the process according to the present invention, in particular the behaviour as a boiling liquid, and about how particular elements may influence that behaviour. Any concern relating to crystal structures when the streams as part of the process according to the present invention is solidifying upon cooling is thus fairly limited to specific points in the process where for instance a molten liquid is cast into anodes as feed for an electrolysis step, or as part of the fractional crystallisation step, or when the final prime products are cast into ingots or other marketable forms.

In an embodiment of the present invention, the metal composition according to the present invention comprises at least 10 or even 15 ppm wt of silver (Ag). Preferably the metal composition according to the present invention comprises at least 20 ppm wt of silver, more preferably at least 30 ppm wt, even more preferably at least 40 ppm wt, preferably at least ppm wt, more preferably at least 60 ppm wt, even more preferably at least ppm wt, preferably at least 80 ppm wt, more preferably at least 90 ppm wt, even more preferably at least 95 ppm wt of silver. Optionally the metal composition comprises at most 450 ppm wt of silver, preferably at most 400 ppm wt, more preferably at most 350 ppm wt, even more preferably at most 300 ppm wt, yet more preferably at most 250 ppm wt, preferably at most 200 ppm wt, more preferably at most 150 ppm wt, even more preferably at most 120 ppm wt, yet more preferably at most 110 ppm wt, preferably at most 100 ppm wt, more preferably at most 90 ppm wt of silver. The applicants have found that a limited amount of silver, as specified, is allowed in the metal composition according to the present invention because most of it may be made to evaporate and to distillate away from the main tin stream together with the lead and the antimony that evaporate in the downstream vacuum distillation step, such that ultimately a high purity tin prime product may be obtained that is in compliance with customer expectations and also suitable for the higher demanding end-uses. Allowing some silver in this stream relaxes the operating targets of the upstream process steps that produce the tin-rich metal composition according to the present invention.

On the other hand, the applicants have found that a limited amount of silver is allowed, and that extra efforts for removing the silver content to very low limits is not justified. The applicants therefore prefer that the metal composition according to the present invention comprises at least the minimum level of silver that is specified above.

In an embodiment of the present invention, the metal composition according to the present invention comprises at least 100 ppm wt and at most 1000 ppm wt of indium (In). Preferably the metal composition according to the present invention comprises at least 200 ppm wt of indium, more preferably at least 300 ppm wt, even more preferably at least 400 ppm wt. Optionally the metal composition according to the present invention comprises at most 900 ppm wt of indium, preferably at most 800 ppm wt, more preferably at most 700 ppm wt, even more preferably at most 600 ppm wt, preferably at most 500 ppm wt, more preferably at most 400 ppm wt of indium. The applicants have found that the indium may be made to evaporate in the distillation step resulting in most of the indium being removed from the tin product precursor as distillation residue, and that only a small amount of indium may be ending up as only a small contaminant in the high purity tin prime product. The applicants have found that the resulting level of indium in the high purity tin prime product is allowable for the commercialisation thereof. In addition, the small amount of indium present in the final tin product brings the advantage of reducing the temperature at which a phenomenon called the "tin pest" is able to occur. Tin pest is an autocatalytic conversion at sufficiently low temperatures of the white beta-form of continuous solid tin into the grey alfa-tin powder form which may give the white tin surface a grey dull aspect and possibly, because of the autocatalytic nature of the conversion, even may lead to physical disintegration of the tin metal object into a grey powder.

In an embodiment of the process according to the present invention, the solder mixture that is provided in step a) complies with at least one and preferably all of the following conditions:
- Comprising at least 45% wt of lead (Pb)
- Comprising at least 10% wt of tin (Sn)
- Comprising at least 90% wt of tin and lead together
- Comprising at least 0.42% wt of antimony (Sb), and
- Comprising at least 0.0010% wt of silver (Ag).

Preferably the solder mixture comprises at least 50% wt of lead, more preferably at least 55% wt, even more preferably at least 60% wt, yet more preferably at least 65% wt, preferably at least 70% wt of lead, and optionally at most 95% wt of lead, preferably at most 90% wt, more preferably at most 85% wt, even more preferably at most 80% wt, preferably at most 75% wt of lead. The applicants have found that a higher amount of lead is favourable for the operations of the process steps that produce the solder mixture, because the lead brings the benefit of a higher density and hence of better physical separations. The applicants prefer to stay below the upper limit as specified, in order to leave room for more tin, which is more valuable than lead, such that a higher economic value may be obtained from processing the solder mixture in the process according to the present invention.

In an embodiment the solder mixture comprises at least 15% wt of tin, preferably at least 20% wt, more preferably at least 22% wt, even more preferably at least 24% wt, preferably at least 26% wt, more preferably at least 28% wt, even more preferably at least 30% wt of tin. The applicants have found that a higher amount of tin in the solder reduces the melting point of the mixture, which makes it easier to handle with less need for heating energy. More tin in the solder mixture also leads to a higher production of the tin prime product, and hence to a higher economic value of the production from the process according to the present invention.

In an embodiment the solder mixture comprises at least 91% wt of tin and lead together, preferably at least 92% wt, more preferably at least 93% wt, even more preferably at least 94% wt, yet more preferably at least 95% wt, preferably at least 96% wt, more preferably at least 96.5% wt, even more preferably at least 97% wt, yet more preferably at least 97.5% wt, preferably at least 98% wt, more preferably at least 98.5% wt, even more preferably at least 98.7% wt of tin and lead together. The solder mixture is a feed stream for the recovery of high purity tin and lead, by the process according to the present invention. A higher content of tin and lead together therefore increases the amount of prime products which may be recovered from the solder mixture, and reduces the amount of usually lower value by-product streams which may emerge from the further purification of the distillation products into prime product streams.

In an embodiment the solder mixture comprises more than 0.42% wt of antimony (Sb), preferably at least 0.43% wt, more preferably at least 0.45% wt, even more preferably at least 0.47% wt, preferably at least 0.50% wt, more preferably at least 0.55% wt, even more preferably at least 0.60% wt, yet more preferably at least 0.65% wt, preferably at least 0.75% wt, more preferably at least 1.0% wt, even more preferably at least 1.5% wt, preferably at least 2.0% wt, more preferably at least 2.5% wt of antimony (Sb). The applicants have found that the solder mixture may contain measurable, and even significant, amounts of antimony, within the specified limits, without this presence of antimony bringing significant impairment to the process capabilities. The applicants have found that this provides extra freedom of operation for the upstream processes from which the feed stream for the process according to the present invention is derived. Thanks to this allowance of an amount of antimony in the solder mixture which they produce as an intermediate stream and as feed for the process according to the present invention, these upstream processes are capable of accepting an amount of raw materials in which antimony is present. Antimony may be present in a variety of primary and/or secondary feedstocks for non-ferrous metals, as well as in many end-of-life materials. Antimony may for instance be present in lead which was used since Roman times for plumbing. These materials may now become available as demolition materials, often in combination with copper for tubing and other purposes, and with tin and lead for the solder connections. Allowing an amount of antimony in the solder mixture, provides the upstream processes the capability to accept such mixed end-of-life materials. The applicants have found that significant concentrations of antimony are allowed in the solder mixture without this creating significant difficulties for the process according to the present invention, as well as for the downstream processes which are further upgrading the streams that are generated by the vacuum distillation steps.

In an embodiment the solder mixture comprises at least 20 ppm wt of silver (Ag), preferably at least 50 ppm wt, more preferably at least 100 ppm wt, even more preferably at least 125 ppm wt and yet more preferably at least 150 ppm wt of silver. The applicants have found that silver may be allowed in amounts in the process streams of the present invention—which are for such a precious metal significant—without impairing the process operability, because silver was not found to be readily forming intermetallic compounds during vacuum distillation. This tolerance for silver allows for the upstream processes, which produce the solder mixture which is the suitable feed stream for the process according to the present invention, and which is at the origin of the tin-rich metal composition according to the present invention, to accept raw materials which contain silver. The silver tends to concentrate in the first bottom product from which it may be recovered by the fractional crystallisation step. The recovery of silver from the bottom stream of the distillation of the solder mixture should therefore bring additional economic value to the process according to the present invention.

In an embodiment of the process according to the present invention, the third bottom product is at least partially and preferably entirely recycled to the feed of second distillation step d) and/or to the feed of the fractional crystallisation step. The applicants have found that the third bottom product has a highly suitable composition for being recycled to at least one of the indicated locations upstream in the process according to the present invention, thanks to the high purity in valuable metals and the low content of non-target metals in the third bottom product. This brings the advantage that the valuable metals may be recovered into the appropriate prime products without high process burdens. The applicants prefer to make the selection of the process location for recycling the third bottom product to dependent on the silver content of the stream, because the fractional crystallisation step is able to remove silver and thereby avoid the build-up of silver in the process above acceptable levels.

In an embodiment of the process according to the present invention, a fresh feed containing lead is added to the feed of the second distillation step d). This brings the advantage of facilitating the evaporation of antimony in the second distillation step, hence improving the quality of the separation that may be obtained in the second distillation step.

In an embodiment of the process according to the present invention, a fresh feed containing lead is added to the feed of the third distillation step e). The applicants have found that an amount of lead is also desirable in the feed to the third distillation step, because the lead facilitates the evaporation of antimony. This brings the advantage of facilitating the evaporation of antimony in the third distillation step, hence improving the quality of the separation that may be obtained in the third distillation step. The lead dilutes the vapour phase in the distillation step and thus acts as a kind of carrier for the antimony. As a result, the lead promotes the recovery of most of the antimony in the third concentrated lead stream and hence contributes to an efficient production of the hard lead prime product. The second concentrated lead stream may for instance contain about 40/40/20% wt of Pb/Sn/Sb. The applicants have found that this feed composition may further be improved. The applicants prefer to dilute the feed for the third distillation step by the addition of lead containing fresh feed down to about 10-12% wt Sb and/or 18-10% wt of Sn. The applicants have found that this provides more vapour phase in the third distillation step, and also reduces the melting point of the feed. This allows for a better removal of Sb towards the third concentrated lead stream as overhead from the Sn which is staying in the third bottom product. The extra benefit is, if the third bottom product is recycled to a location upstream of the second distillation step, that the better separation in the third distillation step reduces the amount of antimony that circulates over the second and third distillation steps.

In an embodiment, the process according to the present invention further comprises the step of removing at least one contaminant selected from the metals arsenic and tin from the third concentrated lead stream, thereby producing a purified hard lead stream as the hard lead product. The applicants have found that the third concentrated lead stream may be further refined by means known in the art to obtain a purified hard lead stream as the hard lead product.

In an embodiment of the process according to the present invention, the at least one contaminant selected from arsenic and tin is removed by treating the third concentrated lead stream at a temperature of less than 600° C. with a second base and a second oxidant, resulting in the formation of a fourth supernatant dross containing a metalate compound of the corresponding contaminant metal, followed by separating the fourth supernatant dross from the purified hard lead stream.

The third concentrated lead stream is contacted preferably with a combination of NaOH and NaNO$_3$ The chemistry which is intended with these chemicals may be represented by the following reactions:

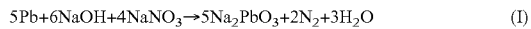

$$5Pb+6NaOH+4NaNO_3 \rightarrow 5Na_2PbO_3+2N_2+3H_2O \quad (I)$$

$$5Na_2PbO_3+4As+2NaOH \rightarrow 4Na_3AsO_4+5Pb+H_2O \quad (II)$$

$$Na_2PbO_3+Sn \rightarrow Na_2SnO_3+Pb \quad (III)$$

The key to this chemistry is the enabling of the generation of the intermediate sodium plumbate (Na$_2$PbO$_3$) by reaction (I). This intermediate plumbate is able to react with the impurities As and/or Sn according to the respective reactions (II) to (III) and captures these each time in the respective sodium metalate compound while setting the Pb free again. The formed sodium metalate compounds are respectively sodium arsenate and sodium stannate.

The respective sodium metalate compounds collect in a supernatant phase, typically called the "dross" or sometimes also "slag". These terms are often used interchangeably, though the term "slag" is typically used for a liquid phase, while "dross" is typically meaning a phase with a less fluid, more solid consistency. The term "slag" is more typically used in the context of producing high melting point non-ferrous metals, such as copper, and is therefore usually a fluid, often comprising primarily metal oxides. The term "dross" is used more frequently in the context of lower melting point non-ferrous metals, such as Sn, Pb, Zn, Al, and which are often in a solid or dusty form. The delineation between these two terms regarding consistency is however not always clear.

The fourth supernatant dross may be skimmed off, and may further be processed, preferably in an upstream process step, for the recovery of at least some of its constituents.

The hard lead refining step is preferably performed at a temperature of at most 550° C., preferably at most 500° C., more preferably at most 450° C. and optionally at least 370° C., preferably at least 390° C., more preferably at least 400° C. Compliance with the upper temperature limit as specified brings the advantage that the feed stream, because this stream becomes typically available from the third vacuum distillation step at a temperature of about 960-970° C., is cooled down. This cooling brings the advantage that any copper that may have ended up in the overhead condensate of the third vacuum distillation step may come out of solution and comes floating on top, such that it may be removed by skimming, optionally together with skimming of the fourth supernatant dross. Performing this step at a temperature in compliance with the lower limit brings the advantage of faster reaction kinetics. Any further copper that may have remained after this cooling and skimming, may be removed by adding sulphur to form a CuS containing dross, and that CuS containing dross may also be removed from the liquid metal by skimming.

In an embodiment of the process according to the present invention, the fourth supernatant dross comprises at most 1.0% wt of chlorine, preferably at most 1.0% wt of total halogens.

The applicants have found that the specified low content of chlorine and/or other halogens in the fourth supernatant dross makes the dross more suitable for being introduced into an upstream pyrometallurgical process step, preferably to a process step wherein at least one of the sodium metalates of Sn and As may be reduced to yield their respective metal Sn or As, preferably with also the Pb ending up in its elementary form.

The fourth supernatant dross is more acceptable in a pyrometallurgical process step thanks to its limited chlorine and/or halogen content. The low chlorine content of the dross reduces the risk for entrainment of valuable metals into the exhaust gas from any pyrometallurgical process step in which an exhaust gas is produced, and thus also reduces the risk for the formation of sticky solid precipitates on coolers, filters and other equipment items in the exhaust gas treatment equipment associated with such a pyrometallurgical process step.

In an embodiment of the process according to the present invention, the fourth supernatant dross is recycled to a process step upstream of the first vacuum distillation step. This brings the advantage that the metal values, in particular any entrained lead, may readily be recovered as part of one of the target prime products of the process according to the present invention. A major portion of the lead entrained in the fourth supernatant dross may preferably end up as part of the soft lead prime product, or, if needed, be made to return to the third concentrated lead stream and become part of the hard lead prime product.

The advantage of this dross recycle capability is that it enables an overall process of much lower complexity, in particular in comparison with the very complex wet chemistry recovery paths described in U.S. Pat. No. 1,674,642.

The suitability of the fourth supernatant dross for being recycled to a pyrometallurgical process step allows to simultaneously remove in one single process step more than one contaminant from the first concentrated lead stream, in this case As and Sn together. This represents a significant improvement as compared to the much more complex lead refining steps described in the art.

In an embodiment of the process according to the present invention, the second oxidant is an oxidant stronger than air. The applicants prefer to use an oxidant that is stronger than air containing 21% vol of oxygen. The applicants have found that the selection of a sufficiently strong oxidant brings the advantage that the desired chemistry is running faster. The higher reaction kinetics bring the advantage that a shorter residence time is necessary for obtaining a desired conversion, such that a smaller reaction vessel may be used, or a given reaction vessel is able to handle a larger throughput.

In an embodiment of the process according to the present invention, the second oxidant is selected from $NaNO_3$, $Pb(NO_3)_2$, $KNO_3$, ozone, nitric acid, sodium and potassium manganate, sodium and potassium (per)manganate, chromic acid, calcium carbonate ($CaCO_3$), sodium and potassium dichromate, preferably $NaNO_3$, $CaCO_3$, $Pb(NO_3)_2$ or $KNO_3$, more preferably $NaNO_3$. The applicants submit that the oxidants in this list are highly suitable, with the preferred elements of the list being even more suitable.

In an embodiment of the process according to the present invention, the second base is selected from NaOH, $Ca(OH)_2$ and $Na_2CO_3$ and combinations thereof, preferably NaOH. The applicants have found that the use of a strong base contributes to fast reaction kinetics and hence to smaller reaction equipment and thus to a lower investment cost. Because the process does not need a selective removal of any one of the target contaminants, the second base does not need to show or be made selective to a specific element of the group Zn, As and Sn. The applicants prefer a (hydr)oxide as the second base, because it avoids extra by-products such as $CO_2$. Carbon dioxide formation may lead to foaming on the bath and the generation of a dross which is much higher in volume and which may run over the side and represent a safety hazard. The applicants prefer to use NaOH because it generates no carbon dioxide like sodium carbonate and because of its more abundant availability. The applicants prefer to use solid sodium hydroxide because this facilitates the phase separation between the skimmings and the molten lead stream. Sand may be added in order to stiffen the dross and facilitate its removal. The applicants have found that NaOH as the second base brings the benefit of promoting the agglomeration of the floating skimmings, which facilitates the selective removal of the fourth supernatant dross.

In an embodiment of the process according to the present invention, in addition to NaOH and $NaNO_3$ also an amount of $Ca(OH)_2$ is added as reagent to treat the third concentrated lead stream. The applicants have found that this improves the physical characteristics of the dross, because this become "drier" and less adhesive to the equipment. A "drier" dross is a dross containing less liquid, the latter being entrained molten lead from the underlying liquid phase. A "drier" dross therefore brings the advantage of an improved separation between lead and dross, and of less (metallic) lead being removed with the fourth supernatant dross and needing to be recovered.

In an embodiment of the process according to the present invention, the weight ratio of second base relative to the second oxidant is in the range of 1.5:1.0 to 4.0:1.0, preferably in the range of 1.8:1 to 2.5:1 when respectively NaOH is used as the second base and $NaNO_3$ is used as the second oxidant and recalculated according to stoichiometry for when other compounds are being used as second base and/or second oxidant, preferably the weight ratio of second base relative to the second oxidant is at most 2.90 for when respectively NaOH is used as the second base and $NaNO_3$ is used as the second oxidant, and recalculated according to stoichiometry for when other compounds are being used as second base and/or second oxidant. The applicants have found that respecting this range as prescribed for the ratio of second base to second oxidant brings the advantage that the viscosity of the fourth supernatant dross is sufficiently high but that this dross does not become excessively hard. The applicants prefer to stay below the upper limit of the ratio as specified, bringing the benefit that the generation of reaction heat remains in control and excessive heating in the hard lead refining step is avoided. The lower amount of strong base also makes the fourth supernatant dross more readily acceptable for recycle to an upstream pyrometallurgical process step because the NaOH or other strong base is corrosive to the refractory lining of the equipment of that step. Less NaOH or other base may therefore lead to less wear and tear on the refractory lining of the equipment where the fourth supernatant dross is recycled to.

In an embodiment of the process according to the present invention, the second base and the second oxidant are mixed with each other before introducing them into the treatment. This brings the advantage of a simplified and easier addition of the chemicals, as compared to the methods of contact and/or addition described in the art. The applicants have found that this treatment step may readily be performed in one single operation. In particular when the fourth supernatant dross is intended for recycle to a pyrometallurgical process step, the applicants have found that the recovered contaminant together with the lead present in any leftover sodium plumbate from reaction (I) that has not reacted away by any of reactions (II) to (III) and with any lead that is physically entrained with the fourth supernatant dross after its separation from the purified hard lead product, may readily be processed and recovered together. The process according to the present invention is also less sensitive than the processes in the art to a limited presence of lead, entrained or as its oxysalt, in the dross. Such extra lead recycle represents only a limited process inefficiency, provided the amounts remain reasonable.

In an embodiment of the process according to the present invention, the third concentrated lead stream comprises at least and at most 15.0% wt of antimony. The presence of antimony in the range as specified brings the benefit of improving the properties of the hard lead prime product derived from the third concentrated lead stream in view of the end-uses that prefer hard lead over soft lead.

In an embodiment, the process according to the present invention comprises the fractional crystallisation step. This brings the benefit that the process also produces a by-product which is rich in silver and which may contribute to the economic value of the products produced by the process according to the present invention. In an embodiment of the process according to the present invention, a suitable fresh feed is also added as extra feed to the crystalliser step.

In an embodiment of the process according to the present invention, the feed to the fractional crystallisation step comprises at least 0.1% wt and at most 20.0% wt of lead.

The applicants have found that the presence of lead in the range as specified brings significant advantages.

One advantage is that a minimum presence of lead, as specified, in the feed to the fractional crystallisation step is a process enabler for the fractional crystallisation step.

A mixture of 38.1% wt Pb and 61.9% wt Sn has a melting temperature of only 183° C., i.e. lower than the melting temperatures of pure lead (327.5° C.) and of pure tin (232° C.). The 38.1/61.9 percent mixture Pb/Sn is called an eutectic composition. When a molten binary mixture of tin and lead having a composition that is different from the eutectic composition is cooled, crystals form which have a composition that differs even more from the eutectic composition, and a liquid phase remains which is having a composition that is closer to the eutectic composition. The applicants have found that this phenomenon allows to separate a suitable mixture of lead and tin, by fractional crystallisation, into on the crystal side, a product that is enriched in either Sn or Pb, and on the liquid side, a product that is having a composition that is closer to the eutectic composition. The minimum presence of lead in the starting material thus enables the separation by fractional crystallisation of a higher purity tin product at the crystal end from a liquid product containing more lead than the starting material.

The applicants have further found, with a lead/tin mixture that is containing more tin than the eutectic composition of tin with lead, and if that mixture is further containing relatively small amounts of silver, that in a fractional crystallisation of the mixture, the silver prefers to stay with most of the lead in the liquid phase, and that tin crystals may be obtained that are much lower in silver and lead. The applicants have found that the lead acts as a carrier for the silver. The applicants have further found, in such fractional crystallisation process, that the silver may be concentrated up from a lower level in the feed mixture to a higher level in the liquid crystalliser product.

The applicants have further found, when the amount of lead in the feed to the fractional crystallisation step is kept below the upper limit as specified, that the silver concentration increase from feed to liquid crystallisation product may be significantly improved. The applicants have found that this allows for the processing of starting materials that contain rather low concentrations of silver, and yet, at the same time, obtain a product stream which is limited in volume and significantly enriched in silver content, such that it becomes suitable for further processing with the purpose of recovering the silver.

Preferably the amount of lead in the feed to the fractional crystallisation step is at least 0.15% wt, preferably at least 0.20% wt, more preferably at least 0.30% wt, even more preferably at least 0.40% wt, yet more preferably at least 0.50% wt, preferably at least 0.60% wt, more preferably at least 0.70% wt, even more preferably at least 0.80% wt, preferably at least 0.90% wt and more preferably at least 1.00% wt. The lead is an enabler to the fractional crystallisation step, and acts as a solvent for the silver that the step wants to remove from the main stream of crude tin. The silver prefers to stay with most of the lead and to end up in the drain, and the composition of the drain is approaching the eutectic composition of 38.1% wt/61.9% wt Pb/Sn. Respecting this lower limit for the presence of Pb favours the operability of the fractional crystallisation step, e.g. in that it assures sufficient liquid phase in the crystalliser stages where a good and intimate contact between liquid and crystals is desired for obtaining an efficient separation.

Preferably the feed to the fractional crystallisation step comprises at most 20.0% wt of Pb, preferably at most 18.0% wt, more preferably at most 16.0% wt. even more preferably at most 14.0% wt, preferably at most 12.0% wt of Pb, preferably at most 10.0% wt, more preferably at most 8.0% wt. even more preferably at most 7.5% wt, preferably at most 6.5% wt of Pb, preferably at most 6.0% wt, more preferably at most 5.5% wt. even more preferably at most 5.25% wt, preferably at most 5.00% wt, more preferably at most 4.90% wt. even more preferably at most 4.80% wt, preferably at most 4.00% wt, more preferably at most 3.00% wt. even more preferably at most 2.00% wt of Pb, preferably at most 1.50% wt of Pb. With lower amounts of lead in the feed to the fractional crystallisation step, the applicants have found that the volume of first silver-enriched liquid drain product may be kept lower and the concentration of silver in the drain may be kept higher. This brings the advantage that there may be recovered silver from more dilute feedstocks, while at the same time producing a first silver-enriched liquid drain product that is sufficiently high in silver to allow an effective and efficient recovery of the silver thereof. The lower volume and higher silver content of the first silver-enriched liquid drain product are also to the benefit of the efficiency and effectiveness of the process steps for the recovery of the silver from the first silver-enriched liquid drain product.

In an embodiment of the process according to the present invention, the lead concentration in the feed to the fractional crystallisation step is at least 3.0 and preferably at least 5.0 times the silver concentration in the feed to the fractional crystallisation step, preferably at least 4.0, more preferably at least 5.0, even more preferably at least 6.0, and yet more preferably at least 7.0 times the silver concentration in the feed. The applicants have found that respecting this lower limit for the ratio of lead to silver concentration in the feed to the fractional crystallisation avoids that the first silver-enriched liquid drain product composition approaches an eutectic composition in the ternary diagram of lead/tin/silver.

In an embodiment of the process according to the present invention the feed to the fractional crystallisation step comprises at least ppm wt of silver (Ag), preferably at least 20 ppm wt, more preferably at least ppm wt, even more preferably at least 30 ppm wt, yet more preferably at least 50 ppm wt, preferably at least 100 ppm wt, more preferably at least 200 ppm wt, even more preferably at least 300 ppm wt, yet more preferably at least 500 ppm wt, preferably at least 750 ppm wt, more preferably at least 1000 ppm wt, even more preferably at least 1100 ppm wt, yet more preferably at least 1200 ppm wt of silver, and optionally at most 0.85% wt of silver, preferably at most 0.80% wt, more preferably at most 0.75% wt, even more preferably at most 0.70% wt, yet more preferably at most 0.65% wt, preferably at most 0.60% wt, more preferably at most 0.55% wt, even more preferably at most yet more preferably at most 0.45% wt, preferably at most 0.40% wt, more preferably at most 0.35% wt, even more preferably at most 0.30% wt, yet more preferably at most 0.25% wt, preferably at most 0.20% wt, more preferably at most 0.175% wt or at most 1750 ppm wt, even more preferably at most 1600 ppm wt, yet more preferably at most 1500 ppm wt. A higher silver content in the crude tin mixture as feed to the fractional crystallisation step brings the benefit that more silver is available for being recovered, and that the first silver-enriched liquid drain product from the fractional crystallisation step may contain more silver, and hence not only represent a higher economic value but from which the recovery of silver may be made more efficiently and more effectively. Respecting the upper limit for the silver content brings the advantage that the drain composition runs a lower risk for approaching the eutectic composition in the ternary diagram for Pb/Sn/Ag. The upper limit on the silver in the crude tin mixture as feed to the fractional crystallisation step also brings the advantage that it allows a significant concentration increase from feed to first silver-enriched liquid drain product of the crystalliser, such that the process is able to accept feedstocks that are lower in silver content, i.e. which may be very dilute in Ag.

In an embodiment of the process according to the present invention, the first tin-enriched product comprises at least 0.10% wt of lead, preferably more than 0.10% wt, more preferably at least 0.15% wt, even more preferably at least 0.20% wt of lead. This brings the advantage that this stream is more suitable as feed for the second distillation step in which lead and antimony are to be removed by evaporation from the main tin stream, and in which the more volatile lead facilitates the evaporation of antimony by diluting the vapour phase in the distillation step. The lead thus acts as a kind of carrier for the antimony. The applicants have found that the lead, in combination with the antimony and after the third distillation step, provides for an overhead product that is suitable for deriving a hard lead prime product therefrom.

In an embodiment of the process according to the present invention, the feed to the fractional crystallisation step further comprises at least 1 ppm wt of at least one metal selected from copper, iron, bismuth, nickel, zinc, gold, indium and arsenic. The presence of traces of copper and iron are a strong indicator that the solder mixture is obtained as a by-product from the production of copper by a pyrometallurgical process. The allowance of small amounts of the listed metals offers feedstock flexibility for the upstream processes providing the solder mixture as feedstock for the first distillation step. The applicants have found that many of the listed metals have a tendency to at least partially end up in the first silver-enriched liquid drain product of the crystallisation step, sometimes even to concentrate into the first silver-enriched liquid drain product, and hence are at least partially removed from the main tin stream, from which then more readily a high purity tin prime product may be derived.

In an embodiment of the process according to the present invention, the feed to the fractional crystallisation step comprises at least 99.0% wt together of tin, lead, antimony and silver, preferably at least 99.1% wt, more preferably at least 99.2% wt, even more preferably at least 99.3% wt, yet more preferably at least 99.4% wt, preferably at least 99.5% wt, more preferably at least 99.6% wt, even more preferably at least 99.7% wt together of tin, lead, antimony and silver. This brings the advantage that the feed to the fractional crystallisation step contains less of other materials, which may possibly represent a burden for the further processing of the crystalliser products and/or may represent a contaminant in at least one of the prime products that may be derived therefrom.

In an embodiment of the process according to the present invention, the second bottom product is further refined to obtain a high purity tin prime product. The applicants have found that the second bottom product is highly suitable for being further refined to obtain a high purity tin prime product having excellent economic value.

In an embodiment of the process according to the present invention, the second bottom product is treated with aluminium metal, preferably in stoichiometric excess relative to the amount of antimony present, preferably accompanied by mixing and cooling the reacting mixture down to below 400° C., followed by separating off the dross containing Al/Sb/As that is formed by the treatment. The applicants have found that the aluminium readily forms solid intermetallic compounds with trace contaminants in the tin stream, in particular with antimony. The applicants prefer to use a stoichiometric excess of aluminium, because this is more effective in removing antimony while any remaining aluminium is fairly readily removable, as described further in this document. The mixing and cooling are facilitating the reaction and separation of the solid compounds formed from the molten tin. The applicants prefer to cool down to a temperature of about 250° C., because they have found that this provides the better balance between the reaction kinetics favoured by high temperatures and an improved separation, favoured by lower temperatures. The dross containing Al/Sb/As that is formed may be skimmed of and may be recycled to an upstream pyrometallurgical process step. The applicants prefer to collect the dross containing Al/Sb/As in steel drums that are closed and sealed, in order to avoid contact of the dross with water, which could generate the formation of the highly toxic gasses arsine and/or stibine. The aluminium is preferably added as granules, offering a high surface area without leading to dust problems. The applicants prefer to add these granules to a bath without violent mixing, preferably static, in order to avoid that any wet granule could explode due to the sudden contact with the hot liquid tin.

In an embodiment of the process according to the present invention, the second bottom product, post the aluminium treatment and preferably also after the removal of the dross containing Al/Sb/As, is treated with a third base, preferably selected from NaOH, $Ca(OH)_2$ and $Na_2CO_3$ and combinations thereof, more preferably NaOH, followed by separating off the dross containing base that is formed by the treatment. The applicants prefer to skim off the dross containing Al/Sb/As before the addition of the third base, in order to need less of that base. The applicants prefer to use NaOH as the third base because this forms a sodium aluminate dross which is more acceptable for recycle to an upstream pyrometallurgical process step. The applicants prefer to perform this treatment iteratively in successively repeated steps and based on an analysis of the tin stream for its aluminium content, in order to save on chemicals consumption. The intended chemistry may generate hydrogen gas, so the applicants prefer to throw an amount of sulphur granules on the reacting liquid, such that the sulphur ignites at the hot process temperatures and burns the hydrogen that may have evolved from the reaction. The dross may be stiffened by adding silicon dioxide, preferably in the form of sand.

In an embodiment of the process according to the present invention, the second bottom product, post the treatment with the third base, is treated with sulphur, followed by separating off the dross containing S that is formed by the treatment. The sulphur reacts with the sodium and forms a $Na_2S$ dross. At the end of this treatment, the applicants prefer to intensify the stirring rate in order to draw in more oxygen from the ambient air, which oxidizes the sulphur remaining after the reaction, and the sulphur oxides that are formed may readily escape from the liquid final product.

In an embodiment, the process according to the present invention comprises the step of removing at least one contaminant selected from the metals arsenic, tin and antimony from the first concentrated lead stream obtained in the first distillation step b), thereby producing a purified soft lead stream as the soft lead product. The applicants have found that, using means known in the art, a soft lead prime product may be derived from the first concentrated lead stream by removing arsenic, tin and/or antimony therefrom. Preferably the applicants perform this soft lead refining step as described in the co-pending patent application in pursuit of the file with European Application No. 19154614.2, and filed on the same day as the present application.

In an embodiment of the process according to the present invention, the at least one contaminant is removed by treating the first concentrated lead stream at a temperature of less than 600° C. with a first base and a first oxidant, resulting in the formation of a third supernatant dross containing a metalate compound of the corresponding contaminant metal, followed by separating the third supernatant dross from the purified soft lead stream which becomes the soft lead prime product of the process according to the present invention.

The first concentrated lead stream is contacted preferably with a combination of NaOH and NaNO$_3$ The chemistry which is intended with these chemicals is the same as explained above by reactions (I) through (III), with the addition of the following reaction:

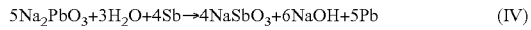

$$5Na_2PbO_3+3H_2O+4Sb \rightarrow 4NaSbO_3+6NaOH+5Pb \qquad (IV)$$

The formed sodium metalate compounds now include as target also sodium antimonate. The respective sodium metalate compounds collect in the third supernatant dross. This dross may be skimmed off, and may further be processed, preferably in an upstream pyrometallurgical process step, for the recovery of at least some of its constituents.

In an embodiment of the process according to the present invention, the soft lead refining step is performed at a temperature of at most 550° C., preferably at most 500° C., more preferably at most 450° C. and optionally at least 370° C., preferably at least 390° C., more preferably at least 400° C. Compliance with the upper temperature limit as specified brings the advantage that the feed stream, because this stream becomes typically available from the first distillation step at a temperature of about 960-970° C., is cooled down. This cooling brings the advantage that any copper that may have ended up in the first concentrated lead stream as overhead from the first vacuum distillation step may come out of solution and comes floating on top, such that it may be removed by skimming, optionally together with skimming of the third supernatant dross. Performing this step at a temperature in compliance with the lower limit brings the advantage of faster reaction kinetics. Any further copper that may have remained after this cooling and skimming, may be removed by adding sulphur to form a CuS containing dross, and that CuS containing dross may also be removed from the liquid metal by skimming.

In an embodiment of the process according to the present invention, the first oxidant is stronger than air. The applicants prefer to use an oxidant that is stronger than air containing 21% vol of oxygen. The applicants have found that the selection of a sufficiently strong oxidant brings the advantage that the desired chemistry is running faster. The higher reaction kinetics bring the advantage that a shorter residence time is necessary for obtaining a desired conversion, such that a smaller reaction vessel may be used, or a given reaction vessel is able to handle a larger throughput.

In an embodiment of the process according to the present invention, the third supernatant dross contains at most 1.0% wt of chlorine, preferably at most 1.0% wt of total halogens.

The applicants have found that the specified low content of chlorine and/or other halogens in the third supernatant dross makes the dross more suitable for being introduced into an upstream pyrometallurgical process step, preferably to a process step wherein at least one of the sodium metalates of Sn, Sb and As may be reduced to yield their respective metal Sn, Sb or As, preferably with also the Pb ending up in its elementary form.

The third supernatant dross is more acceptable in a pyrometallurgical process step thanks to its limited chlorine and/or halogen content. The low chlorine content of the dross reduces the risk for entrainment of valuable metals into the exhaust gas from any pyrometallurgical process step in which an exhaust gas is produced, and thus also reduces the risk for the formation of sticky solid precipitates on coolers, filters and other equipment items in the exhaust gas treatment equipment associated with such a pyrometallurgical process step.

In an embodiment of the process according to the present invention, the third supernatant dross is recycled to a process step upstream of the first vacuum distillation step. This brings the advantage that the metal values, in particular any entrained lead, may readily be recovered as part of one of the target prime products of the process according to the present invention. A major portion of the lead entrained in the third supernatant dross may preferably end up as part of the soft lead prime product, or, if needed, may be made to end up in the third concentrated lead stream and become part of the hard lead prime product.

The advantage of this dross recycle capability is that it enables an overall process of much lower complexity, in particular in comparison with the very complex wet chemistry recovery paths described in U.S. Pat. No. 1,674,642.

The suitability of the third supernatant dross for being recycled to a pyrometallurgical process step allows to simultaneously remove in one single process step more than one contaminant from the first concentrated lead stream, in this case As, Sb and Sn together. This represents a significant improvement as compared to the much more complex lead refining steps described in the art.

In an embodiment of the process according to the present invention, the first oxidant is selected from NaNO$_3$, Pb(NO$_3$)$_2$, KNO$_3$, ozone, nitric acid, sodium and potassium manganate, sodium and potassium (per)manganate, chromic acid, calcium carbonate (CaCO$_3$), sodium and potassium dichromate, preferably NaNO$_3$, CaCO$_3$, Pb(NO$_3$)$_2$ or KNO$_3$, more preferably NaNO$_3$ The applicants submit that the oxidants in this list are highly suitable, with the preferred elements of the list being even more suitable.

In an embodiment of the process according to the present invention, the first base is selected from NaOH, Ca(OH)$_2$ and Na$_2$CO$_3$ and combinations thereof, preferably NaOH. The applicants have found that the use of a strong base contributes to fast reaction kinetics and hence to smaller reaction equipment and thus to a lower investment cost. Because the process does not need a selective removal of any one of the target contaminants, the first base does not need to show or be made selective to a specific element of the group Zn, As, Sb and Sn. The applicants prefer a (hydr)oxide as the first base, because it avoids extra by-products such as CO$_2$. Carbon dioxide formation may lead to foaming on the bath and the generation of a dross which is much higher in volume and which may run over the side and represent a safety hazard. The applicants prefer to use NaOH because it generates no carbon dioxide like sodium carbonate and because of its more abundant availability. The applicants prefer to use solid sodium hydroxide because this facilitates the phase separation between the skimmings and the molten lead stream. Sand may be added in order to stiffen the dross and facilitate its removal. The applicants have found that NaOH as the first base brings the benefit of promoting the agglomeration of the floating skimmings, which facilitates the selective removal of the third supernatant dross.

In an embodiment of the process according to the present invention, in addition to NaOH and $NaNO_3$ also an amount of $Ca(OH)_2$ is added as reagent to treat the first concentrated lead stream. The applicants have found that this improves the physical characteristics of the third supernatant dross, because this become "drier" and less adhesive to the equipment. A "drier" dross is a dross containing less liquid, the latter being entrained molten lead from the underlying liquid phase. A "drier" dross therefore brings the advantage of an improved separation between liquid lead and dross, and of less (metallic) lead being removed with the third supernatant dross and needing to be recovered.

In an embodiment of the process according to the present invention, the weight ratio of first base relative to the first oxidant used is in the range of 1.5:1.0 to 4.0:1.0, preferably in the range of 2:1 to 3:1 when respectively NaOH is used as the first base and $NaNO_3$ is used as the first oxidant and recalculated according to stoichiometry for when other compounds are being used as first base and/or first oxidant. Alternatively, the applicants prefer to apply a molar ratio of the first base over the first oxidant in the range of 3.18-8.5, preferably 4.25-6.38. The applicants have found that respecting this range as prescribed for the ratio of first base to first oxidant brings the advantage that the viscosity of the third supernatant dross is sufficiently high but that this dross does not become excessively hard.

In an embodiment of the process according to the present invention, the weight ratio of first base relative to the first oxidant used is at most 2.90 for when respectively NaOH is used as the first base and $NaNO_3$ is used as the first oxidant, and recalculated according to stoichiometry for when other compounds are being used as first base and/or first oxidant. Preferably the applicants apply a ratio of at most 2.80, more preferably at most 2.70, even more preferably at most 2.60, preferably at most 2.50, more preferably at most 2.40, even more preferably at most 2.30, preferably at most 2.25, more preferably at most 2.20, even more preferably at most 2.15, preferably at most 2.10, more preferably at most 2.05, even more preferably at most 2.00. These limits apply to NaOH as the first base and $NaNO_3$ as the first oxidant, and may be converted according to stoichiometry in case one or more other compounds are used. The limits may also be converted to a molar ratio using the factor *85/40. The applicants prefer to keep the amount of first base, and in particular the amount of NaOH, limited in view of the recycle of the third supernatant dross to an upstream pyrometallurgical process step because the NaOH or other strong base is corrosive to the refractory lining of the equipment of that step. Less NaOH or other base may therefore lead to less wear and tear on the refractory lining of the equipment where the third supernatant dross is recycled to.

In an embodiment of the process according to the present invention, the first concentrated lead stream comprises at least 0.0400% wt and at most 0.3000% wt of tin. The applicants prefer to have in this stream at least 0.0500% wt of tin, preferably at least 0.0700% wt, more preferably at least 0.0800% wt, even more preferably at least 0.0900% wt, yet more preferably at least 0.100% wt of tin. Optionally the applicants prefer to have at most 0.2500% wt of tin in this stream, preferably at most 0.2250% wt, more preferably at most 0.2000% wt, even more preferably at most 0.1500% wt of tin. The applicants have found that having the prescribed amount of tin in the first concentrated lead stream as overhead from the first vacuum distillation step represents an advantageous balance between the amount of Sn that needs to be removed in the soft lead refining step and the amounts of Sb that finds its way into the soft lead refining step and needs to be removed in the soft lead refining step in order to obtain a purified soft lead stream. Sn is in the soft lead refining step easier to remove than Sb because it more readily engages in its reaction (III or IV) to form the corresponding sodium metalate.

In an embodiment of the process according to the present invention, the first distillation step b) is performed at a pressure of at most 15 Pa absolute, preferably at most 10 Pa, more preferably at most 5 Pa, even more preferably at most 1 Pa, yet more preferably at most 0.7 Pa absolute. The applicants have found that a lower pressure is beneficial because it facilitates the separation of the more volatile metals from the less volatile metals. The further advantage is that the separation may be performed at a lower temperature as compared to when using a higher operating pressure. This brings the benefit that the operation is also energetically more efficient.

In an embodiment of the process according to the present invention, the first vacuum distillation step b) is performed at a temperature of at least 800° C., preferably at least 850° C., more preferably at least 900° C., even more preferably at least 930° C. The applicants have found that a higher temperature promotes the separation of the metals into a vapour and a residual liquid phase, for instance because the higher temperature increases the volatility of the more volatile metal or metals. The higher temperature may also increase the difference in volatilities between the metal or metals to be vaporized and the metal or metals to be kept in the liquid phase. The applicants have further found that a higher temperature also reduces the risk that intermetallic compounds may form and/or adhere to the equipment walls, and thus possibly impair the distillation operations.

The vacuum distillation steps in the process according to the present invention may be performed batch-wise, and such batch vacuum distillation techniques have been disclosed in CN101696475, CN104141152, CN101570826, and in Yang et al, "Recycling of metals from waste Sn-based alloys by vacuum separation", Transactions of Nonferrous Metals Society of China, 25 (2015), 1315-1324, Elsevier Science Press. The distillation under vacuum of metals may also be performed in continuous mode, and such continuous distillation techniques have been disclosed in CN102352443, CN104651626 and CN104593614. The applicants prefer to perform the first distillation step as described in WO 2018/060202 A1.

In an embodiment of the process according to the present invention, the feed for the first distillation step b) is a crude solder composition comprising at least 0.16% wt and optionally at most 10% wt of the total of chromium (Cr), manganese (Mn), vanadium (V), titanium (Ti), tungsten (W), copper (Cu), nickel (Ni), iron (Fe), aluminium (Al) and/or zinc (Zn), the feed being available at a temperature of at least 500° C., the process further comprising the step of pre-treating the crude solder composition before step b) to form the solder mixture as feed for the first distillation step b), the pre-treatment step comprising the steps of f) cooling the crude solder composition down to a temperature of at most 825° C., to produce a bath containing a first supernatant dross which by gravity becomes floating upon a first liquid molten metal phase, g) adding a chemical selected from an alkali metal and/or an earth alkali metal, or a chemical compound comprising an alkali metal and/or an earth alkali metal, to the first liquid molten metal phase to form a bath containing a second supernatant dross which by gravity comes floating on top of a second liquid molten metal phase, and h) removing the second dross from the second liquid molten metal phase.

This brings the advantage that the first distillation step may be performed without the formation of intermetallic compounds which are solid at the operating conditions and tend to adhere to the distillation equipment and cause operational problems. The applicants prefer to perform the pre-treatment step as described in WO 2018/060202 A1.

In an embodiment of the process according to the present invention, the solder mixture which is fed to the first distillation step b) comprises, on a weight basis
- at least 90% of tin and lead together,
- more lead than tin,
- at most 0.1% of the total of chromium (Cr), manganese (Mn), vanadium (V), titanium (Ti) and tungsten (W),
- at most 0.1% of aluminium (Al)
- at most 0.1% of nickel (Ni)
- at most 0.1% of iron (Fe), and
- at most 0.1% of zinc (Zn).

The applicants have found that the upper limits for the elements specified of the solder mixture as feed for the first distillation step assures a flawless continuous mode operation of that first distillation step, without running into problems by the formation of solid intermetallic compounds.

The applicants have further found that these precautions with respect to the first distillation process also allow for the second and the third distillation steps to operate flawlessly and without similar problems with intermetallic compound forming.

In an embodiment of the process according to the present invention, the solder mixture which is fed to the first distillation step b) comprises, on a weight basis, at least 1 ppm wt and at most 5000 ppm wt of copper.

The inventors have further found that the possibly harmful metals, and in particular copper, do not need to be removed entirely from the solder mixture in order to make the solder mixture suitable for vacuum distillation. The inventors have for instance found that the identified problems may be reduced to a practically and economically acceptable level when small amounts of copper remain present in the solder feed to the first distillation step.

This finding brings the advantage that solder streams may be processed which occur as the by-product from the recovery of copper from primary and/or secondary feedstocks, in particular from secondary feedstocks, even more importantly from feedstocks containing end-of-life materials.

The solder mixture preferably also comprises at least 0.0001% wt of sulphur (S). The applicants have found that it is not required to bring the levels of sulphur down to very low levels, such as below the detection limit of 1 ppm wt, in order to achieve the result which is targeted with the control of the sulphur content. On the contrary the presence of sulphur in the solder mixture brings a technical benefit.

The applicants have found that sulphur quite readily binds with copper to form a copper sulphide (such as CuS), and that the copper sulphide readily separates by gravity from a liquid metal mixture containing the two main components in the process, i.e. tin and lead. The presence of sulphur is therefore able to contribute in the removal of Cu in every process step which intends to separate Cu in a supernatant dross. The applicants indeed prefer to involve S as a process chemical in the process according to the present invention. The applicants have found that the addition of sulphur containing chemical compounds, such as pyrite (FeS) may actually be suitable for this purpose in appropriate locations to help reducing the copper content of the solder mixture, but the applicants prefer to use elemental sulphur because the use thereof avoids the introduction of one or more extra chemical elements. Hence sulphur in any form, and in particular elemental sulphur, is for the inventors a very suitable process chemical in the removal of some of the undesired metals, in particular of copper.

The presence of sulphur in the solder mixture is therefore a strong indicator that the solder mixture has been produced as a by-product from a copper production process. As a result, the starting material for the process according to the present invention may likely contain measurable amounts of copper as an impurity. The copper content of such starting streams may be reduced by a variety of possible process steps, of which the binding of Cu by S is only one. Any S-treatment for the removal of Cu is very likely to leave measurable traces of S in the metal mixture. The presence of S in the solder mixture therefore provides a strong relation to the solder mixture having been produced as a by-product from copper production, preferably involving a step comprising the treatment with sulphur or a suitable S-containing compound.

The applicants have further found that the presence of sulphur in the solder mixture is of no nuisance if there is also some copper present, as is specified. The S presence is able to contribute in subsequent clean-up steps to remove Cu from the less noble metal streams, in their path to reach an industrially acceptable quality. The S in the solder mixture according to the present invention is therefore a preferred presence, with advantageous benefits showing up downstream.

In an embodiment of the process according to the present invention, at least a part of the process is electronically monitored and/or controlled, preferably by a computer program. The applicants have found that the control of steps from the process according to the present invention electronically, preferably by a computer program, brings the advantage of a much better processing, with results that are much more predictable and which are closer to the process targets. For instance on the basis of temperature measurements, if desired also pressure and/or level measurements and/or in combination with the results of chemical analyses of samples taken from process streams and/or analytical results obtained on-line, the control program may control the equipment relating to the supply or removal of electrical energy, supply of heat or of a cooling medium, a flow and/or a pressure control. The applicants have found that such monitoring or control is particularly advantageous with steps that are operated in continuous mode, but that it may also be advantageous with steps that are operated in batch or semi-batch. In addition and preferably, the monitoring results obtained during or after the performance of steps in the process according to the present invention are also of use for the monitoring and/or control of other steps as part of the process according to the present invention, and/or of processes that are applied upstream or downstream of the process according to the present invention, as part of an overall process within which the process according to the present invention is only a part. Preferably the entire overall process is electronically monitored, more preferably by at least one computer program. Preferably the overall process is electronically controlled as much as possible.

The applicants prefer that the computer control also provides that data and instructions are passed on from one computer or computer program to at least one other computer or computer program or module of the same computer program, for the monitoring and/or control of other processes, including but not limited to the processes described in this document.

EXAMPLE

The following example shows how the process according to the present invention may be operated in more detail and how the targeted effect is obtained. The example also shows how the process according to the invention may be part of a larger overall process which leads to more prime products. The enclosed FIG. 1 shows a flow diagram of the process steps and sequence that were operated in this example. The compositions reported in this example are expressed in weight units, and were the result of analyses of samples taken daily and averaging the results over a 73 day operating period.

In FIG. 1, the numbers represent the following claim features:
1. Crude solder composition as feed to the pre-treatment step 100
2. NaOH added in the pre-treatment step 100
3. Sulphur added in the pre-treatment step 100
4. First supernatant dross from pre-treatment step 100
5. Second supernatant dross from pre-treatment step 100
6. Molten solder mixture obtained from pre-treatment step 100
7. First concentrated lead stream as overhead from vacuum distillation step 200
8. First bottom product of the first vacuum distillation step 200
9. First silver-enriched liquid drain product from the liquid end of the crystallisation step 300
10. First tin-enriched product from crystallisation step 300
11. Fresh feed added to second vacuum distillation step 400
12. Second concentrated lead stream as overhead product from second vacuum distillation step 400
13. Second bottom product from second vacuum distillation step 400
14. Aluminium nuggets to tin refining step 500
15. Third base added in tin refining step 500
16. Sulphur added in tin refining step 500
17. Dross containing Al/Sb/As from tin refining step 500
18. Dross containing base from tin refining step 500
19. Dross containing sulphur from tin refining step 500
20. High purity tin prime product from tin refining step 500
21. Third concentrated lead stream as overhead product from third vacuum distillation step 600
22. Third bottom product, from third vacuum distillation step 600
23. Copper added to soft lead refining step 700
24. First base, added in soft lead refining step 700
25. First oxidant, added in soft lead refining step 700
26. Third supernatant dross formed in soft lead refining step 700
27. Purified soft lead stream or product from soft lead refining step 700
28. Purified hard lead stream or product from hard lead refining step 800
29. Left over of overhead product 21 from previous campaigns
30. Second base, added in hard lead refining step 800
31. Second oxidant, added in hard lead refining step 800
32. Fourth supernatant dross, formed in hard lead refining step 800
33. Fresh feed added to the crude solder pre-treatment step 100
34. Fresh feed added to third vacuum distillation step 600
35. Fresh feed added to fractional crystallisation step 300
36. Fresh feed added to first vacuum distillation step 200
100 Pre-treatment step
200 First vacuum distillation step
300 Fractional crystallisation step
400 Second vacuum distillation step
500 Tin refining step
600 Third vacuum distillation step
700 Soft lead refining step
800 Hard lead refining step For the analysis of a molten metal stream, a sample of liquid metal is taken, poured into a mould and allowed to cool to become solid. One surface of the solid sample is prepared by passing the sample one or preferably more times through a Herzog HAF/2 milling machine until a clean and flat surface is obtained. The clean and flat sample surface is then analysed using a spark optical emission spectroscopy (OES) apparatus Spectrolab M from the company Spectro Analytical Instruments (US), also available via the company Ametek (DE), whereby the parameters, crystals, detectors and tube may readily be selected and adapted in order to achieve the most appropriate performance for the desired accuracy and/or detection limit. The analysis offers results for a variety of metals in the sample, including copper, bismuth, lead, tin, antimony, silver, iron, zinc, indium, arsenic, nickel, cadmium and even the element sulphur, and this for most of these metals down to a detection limit of about 1 ppm wt.

For the analysis of a dross, the inventors prefer to use a properly calibrated X-ray fluorescence (XRF) technique, preferably using the PANalytical Axios XRF spectrometer of the company PANalytical B.V. (NL). This technique is also preferred over the OES mentioned above for analysing samples of metals containing significant amounts of contaminants, such as stream 6 and streams upstream thereof, in the flow diagram in the attached FIG. 1. Also with this technique, the details may readily be selected and adapted in order to optimize the results in terms of accuracy and/or detection limit most fitting the purpose of the analysis.

The crude solder starting material 1 originated from the refining of copper, lead and tin bearing materials in a copper smelter (not shown) which produces a "black copper" intermediate containing about 85% wt of Cu. This black copper was then subjected in a copper refinery to a series of pyrometallurgical refining steps (not shown) which produce on the one hand a higher purity copper prime product, and on the other hand a number of slag by-products. As part of the refinery operations, the crude solder starting material 1 is recovered from some of these refinery slags. Cleaning up of this crude solder is performed by a sequence of pre-treatment steps 100 in order to remove a significant amount of the contained metal impurities, which presence would otherwise risk to become of nuisance during the downstream vacuum distillation steps. The target impurities for the cleaning up steps are primarily Cu, Fe, Ni and/or Zn, and the objective of the crude solder cleaning is that the solder may be processed further, smoothly and flawlessly, using vacuum distillation.

The crude solder 1 was available from the upstream refinery operations at a temperature of about 835° C. In a first step of the cleaning operation sequence 100, the solder was cooled down to 334° C., and this in two steps. In the first cooling step, the crude solder was cooled to about 500° C. and a first dross was removed from the surface of the molten liquid metal. In the second cooling step, the crude solder was cooled further down to 334° C. and a second dross was removed from the surface of the molten liquid metal. The cooling step formed a total dross which contained the majority of the copper present in the crude solder, and which was removed as a by-product (not shown) and recycled in one of the upstream pyrometallurgical process steps. The total flow rate and the concentrations of the metals of interest in the remaining solder intermediate (stream 1) are provided in Table 1. The copper content in the solder had been decreased down to on average 3.0000% wt by this sequence of cooling steps and dross removals. Also the Fe and the Zn concentrations in the solder had decreased significantly. All the dross phases formed during the cooling operation were removed (not shown) and recycled upstream in the process to the smelter step, so that its valuable metal content could be valorised as much as possible.

TABLE 1

The crude solder after the cooling step

| % wt | Crude solder 1 |
|---|---|
| Tons/day | 98.4 |
| Bi | 0.0163 |
| Cu | 3.0000 |
| Fe | 0.0007 |
| Ni | 0.0015 |
| Pb | 69.5000 |
| Sb | 0.8305 |
| Sn | 26.7414 |
| Zn | 0.0028 |
| Ag | 0.0290 |
| Au | 0.0010 |
| As | 0.0515 |
| Cd | 0.0010 |
| In | 0.0125 |
| S | 0.0025 |
| Te | 0.0007 |
| Total | 100.1914 |

In a second part of the cleaning operation sequence 100, solid sodium hydroxide (stream 2) was added to the solder intermediate of Table 1. In this treatment step, zinc was bound by the sodium hydroxide, presumably to form $Na_2ZnO_2$, and forming a separate phase which separated as a first supernatant solid dross from the solder and which was removed as stream 4. As a result, the zinc content in the solder stream 6 had further been decreased. The amount of sodium hydroxide was adjusted such that the Zn concentration in the solder was decreased down to 13 ppm weight (Table 2). The dross which was formed in this step was also recycled (stream 4) to the upstream smelter step, where zinc may be fumed out and recovered as zinc oxide dust.

In the next part of the cleaning operation sequence 100, after the addition of sodium hydroxide and the removal of the first supernatant solid dross phase 4, also an amount of elemental sulphur (stream 3), representing about 130% of stoichiometry relative to the amount of copper present in the metal phase, was added to further reduce the copper content of the solder. As elemental sulphur was used a granulated form of sulphur obtainable from the company Zaklady Chemiczne Siarkopol in Tarnobrzeg (PL). The sulphur 3 reacted primarily with copper to form copper sulphides which moved into a second supernatant dross. This second supernatant dross was then removed as stream 5 and recycled to a suitable upstream process step. After the sulphur addition in step 100, a further amount of sodium hydroxide (stream 2) was added to chemically bind any leftover traces of sulphur to form yet another dross. After allowing some time for the reaction, a handful of granulated sulphur 3 was scattered/spread over the bath surface. The sulphur ignited and burned any hydrogen which could have evolved from the liquid as a by-product from the reaction. Subsequently, a small amount of white sand was scattered/spread over the bath in order to dry/stiffen the dross before its removal from the process (stream not shown in the drawing) and its recycle to an upstream process step. The thus obtained cleaned solder (stream 6, of which the flow rate and composition is provided in Table 2) contained only 38 ppm Cu and was further processed as the molten solder mixture obtained from pre-treatment step 100 by means of vacuum distillation in step 200. The second supernatant dross 5 was reprocessed in the upstream refinery process, so that its valuable metal content could be valorised.

TABLE 2

Cleaned solder for vacuum distillation

| Wt % | Molten solder mixture - 6 |
|---|---|
| Tons/day | 72.0 |
| Bi | 0.0326 |
| Cu | 0.0038 |
| Fe | 0.0004 |
| Ni | 0.0009 |
| Pb | 73.1206 |
| Sb | 0.8012 |
| Sn | 25.8694 |
| Zn | 0.0013 |
| Ag | 0.0500 |
| As | 0.0871 |
| Au | 0.0015 |
| Cd | 0.0020 |
| In | 0.0202 |
| S | 0.0053 |
| Te | 0.0010 |
| Total | 99.9973 |

The molten solder mixture 6 was further processed using vacuum distillation (step 200), at an average temperature of 982° C. and an average absolute pressure of 0.012 mbar (1.2 Pa). The vacuum distillation step produced two product streams. On the one hand we obtained as overhead stream 7 a first concentrated lead stream which contained mainly lead and on the other hand we obtained as the first bottom product 8 of the first distillation step 200 a product stream which contained mainly tin. The flow rates and compositions of these two distillation product streams 7 and 8 are provided in Table 3.

TABLE 3

Product streams of the first vacuum distillation 200

| Wt % | Overhead 7 | Bottom 8 |
|---|---|---|
| Tons/day | 61.8 | 24.8 |
| Bi | 0.0425 | 0.0014 |
| Cu | 0.0000 | 0.0122 |
| Fe | 0.0000 | 0.0015 |
| Ni | 0.0000 | 0.0028 |
| Pb | 99.5375 | 1.0055 |
| Sb | 0.2233 | 1.9800 |
| Sn | 0.1006 | 96.3129 |

TABLE 3-continued

Product streams of the first vacuum distillation 200

| Wt % | Overhead 7 | Bottom 8 |
|---|---|---|
| Zn | 0.0018 | 0.0001 |
| Ag | 0.0031 | 0.1400 |
| As | 0.0746 | 0.0700 |
| Au | 0.0000 | 0.0043 |
| Cd | 0.0024 | 0.0000 |
| In | 0.0057 | 0.0460 |
| S | 0.0071 | 0.0000 |
| Te | 0.0014 | 0.0000 |
| Total | 100.0000 | 99.5767 |

The first vacuum distillation step 200 was performed in continuous mode, and was able to operate during a time period of about three (3) years without the observation of any blocking or clogging of the distillation equipment due to the formation of intermetallic compounds.

The first concentrated lead stream 7 became available from the distillation equipment at a temperature of about 562° C. The temperature of stream 7 was controlled to become about 450° C. while being stirred before this stream was further refined. Consecutive volumes of 100-120 tons of stream 7 were allowed to collect in a tank. These volumes were subjected batchwise to the soft lead refining operation 700. A sample was taken from each batch and analysed for As, Sn and Sb to determine the amounts of solid sodium hydroxide (stream 24) and solid sodium nitrate (stream 25) that were required to react with the As, Sn and Sb present in the metal phase, and these amounts were added as first base and first oxidant. Sampling and analysis were repeated after allowing some time for the reaction and after the removal of the third supernatant dross 26 formed by the reaction. If the result was not satisfactory, the process step was repeated. For the total volume of soft lead that was produced over the 73 day operating period, 29.3 metric tons of sodium hydroxide (401 kg/day) and 15.5 metric tons of sodium nitrate (212 kg/day) were used in the process for removing most of the on average 46 kg/day of As, 62 kg/day of Sn and 138 kg/day of Sb, a total of on average 246 kg/day of the 3 elements together, that were present in the feed to step 700 with stream 7. This refining step formed in each batch a third supernatant dross phase which contained the majority of the As, Sn and Sb present in the first concentrated lead stream 7 and which was removed as a by-product (stream 26). The third supernatant dross phase was sampled and analysed for chlorine content using the method according to DIN EN 14582 standard. The analysis showed a chlorine presence of about 129 ppm by weight. The soft lead prime product 27 was then poured into moulds and allowed to solidify and cool to become lead ingots.

In most of the batches, a small amount of copper 23 was added into the feed to step 700 in order to produce a quantity of Cu-containing soft lead. The small amount of copper present is improving the mechanical properties of the soft lead, which makes the soft lead more suitable for being rolled into lead film for the construction industry or for the lead cladding of surfaces. A number of batches which contained above average contents of Bi were also kept apart as Bi-rich soft lead, acceptable in particular end-uses and bringing the advantage that Bi-containing raw materials become more readily acceptable for the process according to the present invention and/or for the upstream processes providing a feedstock for it. This refining of soft lead was performed batchwise in the same equipment as the refining of hard lead, which is discussed further below. The transition between the batches of soft lead and hard lead generates an amount of intermediate quality material, which is commercialised as "unrefined soft lead". The daily average production rates (spread over the 73 day long production period considered) and compositions of these various soft lead end product streams 27 are given in Table 4.

TABLE 4

Composition of the soft lead end products 27 (wt %)

| Soft lead Products 27 | Soft lead | Unrefined Soft lead | Cu-tagged Soft lead | Bi-rich Soft lead |
|---|---|---|---|---|
| Tons/day | | 5.7 | 39.8 | 14.8 |
| Bi | | 0.0905 | 0.0319 | 0.0568 |
| Cu | | 0.0001 | 0.0428 | 0.0008 |
| Fe | | 0.0000 | 0.0000 | 0.0000 |
| Ni | | 0.0000 | 0.0000 | 0.0000 |
| Pb | | 99.6306 | 99.9026 | 99.9240 |
| Sb | | 0.2279 | 0.0000 | 0.0000 |
| Sn | | 0.0208 | 0.0006 | 0.0004 |
| Zn | | 0.0001 | 0.0001 | 0.0001 |
| Ag | | 0.0032 | 0.0034 | 0.0025 |
| As | | 0.0259 | 0.0002 | 0.0002 |
| Cd | | 0.0002 | 0.0000 | 0.0000 |
| In | | 0.0007 | 0.0001 | 0.0001 |
| S | | 0.0006 | 0.0003 | 0.0003 |
| Te | | 0.0000 | 0.0000 | 0.0000 |
| Au | | 0.0000 | 0.0000 | 0.0000 |
| Total | | 99.7727 | 99.9820 | 99.9852 |

The first bottom product 8 from first vacuum distillation step 200 was mixed with the third bottom product 22 from the downstream third vacuum distillation step 600 and the mixture was fed to the fourth zone of a first crystalliser having 12 temperature zones. The crystalliser was a cylindrical vessel slightly tilted from being fully horizontal and comprised an internal rotating screw for moving the crystals that are formed from the lower end to the higher end of the cylindrical vessel. The temperature zones were numbered from 0 to 11 from the lower end to the higher end. By appropriate heating and cooling means, a temperature profile was established inside the crystalliser. The temperature of zone 3 which was receiving the feed was about controlled to be about 210° C. The temperature increased stepwise from zone 3 to zone 11 (230-250° C.) upwards in the crystalliser, where the tin-rich crystals are removed from the apparatus. The temperature reduced slightly downwards in the crystalliser, from zone 3 to zone 0 (199° C.), but was raised again in zone up to about 220° C., to assure that the temperature in that zone always remained above the liquidus line in the phase diagram, such that any growth of solids on the blades of the screw was avoided, which might otherwise introduce the need for operator intervention and temporary decommissioning of the equipment.

Before feeding the feed stream to the crystalliser, the stream was passed through a buffer vessel having a holdup of a few hours of production, in which some mixing smoothens out any temperature changes that may have occurred upstream, such that the temperature of the feed entering the crystalliser into zone 3 is fairly constant and any changes thereof are very slow. In addition the temperature of the feed to zone 3 is maintained somewhat above the temperature in zone 3 of the crystalliser, to avoid solid formation in the supply system. By entering zone 3 of the crystalliser the feed stream is cooled down and comes inside the range within which a stream having this composition separates into a solid phase of small crystals that are enriched in tin content, in equilibrium with a liquid phase that is leaner in tin but richer in lead and in precious metals. The temperature increase of the liquid moving down in the crystalliser from zone 1 further down to 0 brought the benefit that growth of solids on the perimeter of the blades of the screw was prevented in the lower part of the cylindrical vessel, such that there remained sufficient space below the screw blades for allowing liquid to flow from the upper end of the cylindrical vessel to the lower end.

The crystalliser was tilted, such that the liquid phase in the vessel was readily able to move by gravity from the higher end towards the lower end of the apparatus. The turning screw inside the crystalliser moved the crystals in the opposite direction through the continuous liquid phase present in the crystalliser. The liquid level in the crystalliser was maintained below the overflow point for the crystals, to minimize liquid entrainment with the first tin-enriched product, but sufficiently high to facilitate the transfer of heat from vessel wall to vessel content. The crystals ending up at the higher end had become enriched in tin and substantially all of the lead and precious metals from the feed were retrieved in the liquid first drain leaving the crystalliser at the lower end. This first drain further contained tin in a significant amount but at a concentration below the level of tin in the crystalliser feed.

The Sn crystals were removed from the upper end of the first crystalliser and were introduced into the fourth zone (again zone 3) of a second crystalliser also having 12 temperature zones numbered from 0 to 11. In the second crystalliser also a temperature profile was applied, similar to the one in the first crystalliser, which caused a further separation of a second liquid drain from the first tin-enriched crystals before these crystals leave the second crystalliser at the upper end (stream 10).

The antimony entering with the crystalliser feed is primarily following the path of the main flow of tin. The drain from the second crystalliser was recycled to the first crystalliser, where it was mixed in with the feed. When the Pb concentration was deemed excessive, the drain from the second crystalliser was temporarily recycled to the feed of the upstream first vacuum distillation step 200 in order to maintain a higher concentration factor of Ag from vacuum distillation bottom stream 8 to net first silver-enriched liquid drain product 9. Also when the Cu concentration in the crystalliser streams, and thus also in the drain from the second crystalliser, this drain is—at least temporarily— preferably recycled to a process step further upstream than the feed to the first crystalliser, preferably to the feed of the first step of the cleaning operation sequence 100, to be mixed with the crude solder composition 1.

The first silver-enriched liquid drain product was leaving the first crystalliser as a Sn/Pb alloy by-product containing most of the Ag present in the crystalliser feed. The flow rates and compositions of the outlet product streams 9 and 10 of the 2-crystalliser assembly in step 300 are given in Table 5. Sb was found to also enrich in the first tin-enriched crystal phase leaving the second crystalliser, but some Sb was also retrieved in the first silver-enriched liquid drain product. The silver-enriched liquid drain product 9 of Table 5 represents the net drain volume and its composition. Temporarily and depending on its composition, recycle of the silver-enriched liquid drain product was operated from the lower end of the first crystalliser to the feed of the first crystalliser in order to further boost the concentration factor of Ag from the crystalliser feed (streams 8+22) to the net first silver-enriched liquid drain product 9.

TABLE 5

Product streams of the crystalliser assembly

| Wt % | First silver-enriched liquid drain product 9 | First tin-enriched product 10 |
|---|---|---|
| Tons/day | 1.3 | 27.0 |
| Bi | 0.0079 | 0.0010 |
| Cu | 0.2900 | 0.0014 |
| Fe | 0.0012 | 0.0016 |
| Ni | 0.0215 | 0.0023 |
| Pb | 16.5000 | 0.2387 |
| Sb | 0.4020 | 2.1000 |
| Sn | 79.5000 | 97.0536 |
| Zn | 0.0042 | 0.0000 |
| Ag | 2.8000 | 0.0100 |
| As | 0.1144 | 0.0680 |
| Cd | 0.0001 | 0.0000 |
| In | 0.1039 | 0.0411 |
| S | 0.0000 | 0.0000 |
| Te | 0.0000 | 0.0000 |
| Au | 0.0129 | 0.0034 |
| Total | 99.7581 | 99.5211 |

The net first silver-enriched liquid drain product 9 from the first crystalliser was transferred to a downstream purification step (not shown) to recover all precious metals as well as the Sn and Pb. For that purpose, the silver-enriched liquid drain product was cast into anodes and submitted to an electrolysis step wherein pure Pb and Sn containing cathodes were produced and the other metals remain in the anode slimes. Typical conditions of this electrolysis step are: Electrolyte based on hexafluorosilicic acid ($H_2SiF_6$), fluoroboric acid and/or phenyl sulphonic acid; temperature about 40° C.; current density 140-200 A/m$^2$; electrode spacing about 100 mm. Antimony may be added to the anode composition, typically to a concentration of about 1.5% wt. This brings the advantage that the anode slimes remain attached to the anodes and do not disperse in the electrolyte. To avoid full anode passivation, leading to inhibition of the electrolysis, periodically and consecutively a portion of the anodes may be removed from the bath, their anode slimes be removed, e.g. mechanically, and the cleaned anodes may then be replaced in the cell. The anodes may also be designed such that the cleaned anodes have become sufficiently thin such that it is more efficient and/or effective to melt them into new anodes. These anode slimes (about 180 kg/day on average) were recovered, e.g. by filtration, from the entrained electrolyte and these anode slimes contained about 20% wt of silver and also a much smaller concentration of gold, together with most of the other metals present in the first silver-enriched liquid drain product, including antimony and any platinum group metals (PGM's). The anode slimes were further processed for recovery of the silver and the other precious metals. The filtrate was recycled to the electrolysis cell.

The first tin-enriched crystals 10 from the second crystalliser were further processed through the second vacuum distillation step 400, operated at an average temperature of 1049° C. and an average absolute pressure of 0.005 mbar (0.5 Pa). Spread over the 73 day operating period, an amount of 157.6 tonnes of lead containing feedstocks 11, on average about 2.2 metric tons per day, was gradually added to the first tin-enriched crystals to keep the solidification point low of the overhead product from step 400. The flow rate and composition of stream 11 is given in Table 6.

TABLE 6

Added feedstock in feed to the second vacuum distillation

| Wt % | Pb containing feedstocks 11 |
|---|---|
| Tons/day | 2.2 |
| Bi | 0.0299 |
| Cu | 0.0161 |
| Fe | 0.0018 |
| Ni | 0.0003 |
| Pb | 58.8711 |
| Sb | 0.0006 |
| Sn | 41.0558 |
| Zn | 0.0001 |
| Ag | 0.0036 |
| As | 0.0015 |
| Cd | 0.0000 |
| In | 0.0017 |
| S | 0.0002 |
| Te | 0.0000 |
| Au | 0.0001 |
| Total | 99.9827 |

The second vacuum distillation step 400 produced two product streams. On the one hand we obtained as overhead product 12 a product stream which contained mainly most of the lead, antimony and silver from the feed, plus some tin, and on the other hand we obtained as the second bottom product 13 a product stream which contained primarily tin with only trace quantities of other components. The flow rates and compositions of these two distillation product streams 12 and 13 are shown in Table 7.

TABLE 7

Product streams of the second vacuum distillation

| Wt % | Overhead 12 | Bottom 13 |
|---|---|---|
| Tons/day | 3.6 | 25.6 |
| Bi | 0.0189 | 0.0004 |
| Cu | 0.0000 | 0.0028 |
| Fe | 0.0000 | 0.0019 |
| Ni | 0.0000 | 0.0025 |
| Pb | 37.8602 | 0.0011 |
| Sb | 13.0000 | 0.3800 |
| Sn | 47.7097 | 99.4584 |
| Zn | 0.0000 | 0.0000 |
| Ag | 0.0560 | 0.0029 |
| As | 0.3900 | 0.0178 |
| Au | 0.0000 | 0.0036 |
| Cd | 0.0000 | 0.0000 |
| In | 0.3050 | 0.0006 |
| S | 0.0001 | 0.0000 |
| Te | 0.0000 | 0.0000 |
| Total | 99.3400 | 99.8719 |

The second vacuum distillation step 400 was performed in continuous mode, and was able to operate during a time period of about three (3) years without the observation of any blocking or clogging of the distillation equipment due to the formation of intermetallic compounds.

The second bottom product 13 from step 400 was further refined batchwise in three consecutive steps, collectively shown in the flow diagram as tin refining step 500. The first tin refining step consisted of cooling the second bottom product 13 and adding an amount of aluminium nuggets (stream 14) to the second bottom product which was having an average temperature of 430° C., under agitation, in order to react with and remove Sb and As down to a level in compliance with established international industry standards. The amount of Al to be added was based on an analysis of the second bottom product 13 and included an extra above the stoichiometric requirement. After the reaction, the composition was again analysed and, if the result was insufficient, in particular the Sb content, an additional amount of Al was introduced for triggering a second reaction step. In total, on average an amount of about 4.3 kg of Al per metric ton of second bottom product 13 was used. About 30 minutes after the last addition, the heating and the agitation were stopped and the liquid molten metal composition was allowed to cool down. During this cooling, down to a temperature of on average about 250° C., a layer of Al/Sb/As containing dross was formed and this dross was periodically removed from the surface of the molten liquid metal. The dross was collected and stored in dry, closed and double-walled steel barrels to prevent contact with water or moisture which could lead to the formation of stibine and/or arsine. The barrels were removed as a by-product (stream 17) and were recycled to an upstream pyrometallurgical process step, where they were introduced unopened into a liquid bath of molten metal and/or slag, thereby avoiding any risk for contact with moisture.

After raising the temperature of the tin product again up to about 330° C., the molten liquid metal was subjected to a second tin refining step in which solid sodium hydroxide (stream 15) was added as the third base. In this treatment step, aluminium was bound by the sodium hydroxide, presumably to form $Na_3AlO_3$, and forming a separate phase which separated as a supernatant solid dross from the molten liquid metal and which was removed as stream 18. After allowing some time for the reaction, a handful of granulated sulphur was scattered/spread over the bath surface. The sulphur ignited and burned any hydrogen which could have evolved from the molten liquid metal as a by-product from the reaction. As a result, the aluminium content in the second bottom product 13 was further decreased. The amount of sodium hydroxide to be added was adjusted such that the aluminium concentration in the second bottom product decreased down to below the detection limit of 1 ppm weight (Table 8). The dross which was formed in this step was also recycled (stream 18) to an upstream pyrometallurgical process step.

In the third and last tin refining step an amount of elemental sulphur (stream 16) was added to further reduce the copper content of the molten liquid metal and to remove any sodium hydroxide that remained from the second tin refining step. As elemental sulphur was used a granulated form of sulphur obtainable from the company Zaklady Chemiczne Siarkopol in Tarnobrzeg (PL). The sulphur 16 reacted primarily with copper to form copper sulphides and with sodium hydroxide to form $Na_2SO_2$ which moved into another supernatant dross phase. After the sulphur addition the agitator was kept operating for about 10 minutes to oxidise any leftover traces of sulphur and forming another dross. The dross was removed from the molten liquid metal as stream 19. The thus obtained high purity Sn prime product (stream 20, of which the flow rate and composition is provided in Table 8) contained only 14 ppm Cu and was casted into ingots of 22 kg, stacked, weighed and strapped. The dross containing sulphur 19 was reprocessed in an upstream pyrometallurgical process step.

TABLE 8

High purity Sn end product

| Wt % | High purity Sn 20 |
|---|---|
| Tons/day | 24.6 |
| Bi | 0.0001 |
| Cu | 0.0014 |
| Fe | 0.0004 |
| Ni | 0.0000 |
| Pb | 0.0008 |
| Sb | 0.0160 |
| Sn | 99.9758 |
| Zn | 0.0000 |
| Ag | 0.0030 |
| As | 0.0006 |
| Au | 0.0001 |
| Cd | 0.0000 |
| In | 0.0006 |
| S | 0.0000 |
| Te | 0.0000 |
| Al | 0.0001 |
| Total | 99.9989 |

The overhead product 12 of the second vacuum distillation step 400 was further processed in the third vacuum distillation step 600, operated at an average temperature of 1000° C. and an average absolute pressure of 0.033 mbar (3.3 Pa). The third vacuum distillation step 600 produced two product streams. On the one hand we obtained as overhead product 21 a product stream which contained mainly lead and antimony and on the other hand we obtained as the third bottom product 22 a product stream which contained mainly tin and part of the antimony, plus most of the precious metals present in the distillation feed. The flow rates and compositions of these two distillation product streams 21 and 22 are shown in Table 9.

TABLE 9

Product streams of the third vacuum distillation

| Wt % | Overhead 21 | Bottom 22 |
|---|---|---|
| Tons/day | 5.5 | 2.5 |
| Bi | 0.0474 | 0.0011 |
| Cu | 0.0000 | 0.0265 |
| Fe | 0.0000 | 0.0004 |
| Ni | 0.0000 | 0.0075 |
| Pb | 90.1133 | 0.7827 |
| Sb | 9.1014 | 2.1363 |
| Sn | 0.5379 | 96.8647 |
| Zn | 0.0002 | 0.0001 |
| Ag | 0.0100 | 0.0950 |
| As | 0.4700 | 0.0730 |
| Cd | 0.0019 | 0.0000 |
| In | 0.1860 | 0.0297 |
| S | 0.0022 | 0.0000 |
| Te | 0.0013 | 0.0000 |
| Au | 0.0000 | 0.0000 |
| Total | 100.4716 | 100.0170 |

The third vacuum distillation step 600 was performed in continuous mode, and was able to operate during a time period of about three (3) years without the observation of any blocking or clogging of the distillation equipment due to the formation of intermetallic compounds.

The third bottom product 22 was recycled to the first crystalliser of upstream step 300, where it was mixed in with first bottom product 8 from step 200, for recovering its valuable metals content.

The overhead product 21 was further refined in step 800, batchwise in the same equipment that was used during the soft lead refining step 700 of the first concentrated lead stream as overhead stream 7 from the first vacuum distillation step 200. Over the operating period of 73 days, in addition another 810.2 metric tons of overhead product from the third vacuum distillation that had been left over from previous campaigns (stream 29), on average about 11.1 tons/day, was mixed in with stream 21 and refined together therewith. The refining of this hard lead was performed batchwise in volumes of 100-120 tons of total feed. During the 73 days of operating time considered in this example, about 9 days were dedicated to the refining of 1159 tons of hard lead, at about 129 tons/day, and during 43 days the equipment was used for the refining of together 4400 tons of the soft lead products as described above, on average at about 102 tons/day.

The molten liquid metal feed of hard lead for the hard lead refining step 800 was first heated up to about 450° C. while being stirred. A sample was taken and analysed for As and Sn to determine the amounts of solid sodium hydroxide (stream 30) and solid sodium nitrate (stream 31) that was deemed required to remove the As and Sn from the molten liquid metal phase, and these amounts were added as the second base and the second oxidant. Over the 73 day operating period that was considered for this example, a total of 15.2 metric tons of sodium hydroxide (on average 208 kg/day) plus 7.6 metric tons of sodium nitrate (on average 104 kg/day) were added into this refining step for removing most of the on average 26 kg/day of As and 32 kg/day of Sn that was coming into step 800 with streams 21 and 29 together. Almost all of the 1502 kg/day of Sb present in the feed streams to hard lead refining step 800 remained in the purified hard lead product 28. This hard lead refining step formed a total fourth supernatant dross phase which contained the majority of the As and Sn present in the overhead products 21 and 29 and which was removed as a by-product (stream 32). The fourth supernatant dross phase was sampled and analysed for chlorine content with the method according to DIN EN 14582. The analysis showed a chlorine presence of about 130 ppm by weight. The flow rate and composition of the purified hard lead end product stream 28 is given in Table 10.

TABLE 10

Composition of the hard lead end product

| Wt % | Hard lead 28 |
|---|---|
| Tons/day | 15.9 |
| Bi | 0.0550 |
| Cu | 0.0000 |
| Fe | 0.0000 |
| Ni | 0.0000 |
| Pb | 91.4680 |
| Sb | 8.9900 |
| Sn | 0.0192 |
| Zn | 0.0001 |
| Ag | 0.0112 |
| As | 0.0025 |
| Cd | 0.0002 |
| In | 0.0005 |
| S | 0.0005 |
| Te | 0.0000 |
| Au | 0.0000 |
| Total | 100.5472 |

This hard lead refining step was thus targeting in step 800 only the removal of a total of on average 58 kg/day of impurities, which is significantly less than the removal target of step 700. In addition, the concentrations of As and Sn in the feed to step 800 were also higher than these in the feed to step 700. Step 800 therefore reaches its targets much easier than step 700. Relative to the total amount of (As+Sn+Sb) that enters the respective lead refining steps 700 and 800, the step 800 consumes significantly less chemicals and also produces significantly less supernatant dross than step 700, which also brings the benefit of causing a lesser burden for recycling the supernatant dross in the upstream pyrometallurgical process. It was also observed that in step 800, As and Sn could successfully be removed to very low levels while hardly any Sb needed to be removed.

Having now fully described this invention, it will be appreciated by those skilled in the art that the invention can be performed within a wide range of parameters within what is claimed, without departing from the scope of the invention, as defined by the claims.

The invention claimed is:

1. A metal composition comprising, on a dry weight basis:
   at least 0.08% wt and at most 6.90% wt of lead (Pb);
   at least 0.50% wt and at most 3.80% wt of antimony (Sb);
   at least 92.00% wt and at most 98.90% wt of tin (Sn);
   at least 96.00% wt of tin, lead, and antimony together;
   at least 1 ppm wt and at most 500 ppm wt of copper (Cu);
   at least 10 ppm wt and at most 0.0500% wt of silver (Ag);
   at most 0.40% wt of arsenic (As);
   at most 0.1% of the total of chromium (Cr), manganese (Mn), vanadium (V), titanium (Ti), and tungsten (W);
   at most 0.1% of aluminium (Al);
   at most 0.1% of nickel (Ni);
   at most 0.1% of iron (Fe); and
   at most 0.1% of zinc (Zn).

2. The metal composition according to claim 1 being a molten liquid.

3. A process for the production of a soft lead product, a hard lead product and a tin product, the process comprising:
   a) providing a solder mixture comprising primarily major amounts of lead and tin, together with a minor amount of antimony;
   b) a first distillation step separating off by evaporation primarily lead from a feed comprising the solder mixture from step a), thereby producing as overhead product a first concentrated lead stream and a first bottom product enriched in tin, the first concentrated lead stream forming the basis for obtaining the soft lead product;
   c) a second distillation step separating off by evaporation primarily lead and antimony from a feed comprising the metal composition according to claim 1 which is the first bottom product from step b) thereby producing as overhead product a second concentrated lead stream and a second bottom product, the second bottom product forming the basis for obtaining the tin product; and
   d) a third distillation step separating off by evaporation primarily lead and antimony from a feed comprising the second concentrated lead stream from step c), thereby producing as overhead product a third concentrated lead stream and a third bottom product, the third concentrated lead stream forming the basis for obtaining the hard lead product.

4. The process according to claim 3 wherein the solder mixture complies with at least one of the following conditions;
   comprising at least 45% wt of lead (Pb);
   comprising at least 10% wt of tin (Sn);
   comprising at least 90% wt of tin and lead together;
   comprising at least 0.42% wt of antimony (Sb); or
   comprising at least 0.0010% wt of silver (Ag).

5. The process according to claim 3, wherein a fresh feed containing lead is added to the feed of the second distillation step c).

6. The process according to claim 3, wherein a fresh feed containing lead is added to the feed of the third distillation step d).

7. The process according to claim 3, further comprising the step of removing at least one contaminant selected from the metals arsenic and tin from the third concentrated lead stream, thereby producing a purified hard lead stream as the hard lead product.

8. The process according to claim 3, wherein the third concentrated lead stream comprises at least 0.50% wt and at most 0.0% wt of antimony.

9. The process according to claim 3, wherein silver is present in the solder mixture, the process comprising a fractional crystallization step performed on a feed comprising the first bottom product from step b) for separating silver from tin and producing a drain product from the liquid end of the crystallization step enriched in silver and a first tin-enriched product from the crystal end of the crystallization step, and whereby the first tin-enriched product from the crystal end of the crystallization step comprises the metal composition according to claim 1 and is in the feed for the second distillation step c).

10. The process according to claim 9, wherein the silver concentration in the feed to the fractional crystallization step is at least 10 ppm wt.

11. The process according to claim 3, wherein the second bottom product is further refined to obtain a high purity tin prime product.

12. The process according to claim 3, further comprising the step of removing at least one contaminant selected from the metals arsenic, tin, and antimony from the first concentrated lead stream obtained in the first distillation step b), thereby producing a purified soft lead stream as the soft lead product.

13. The process according to claim 3, wherein the first distillation step b) is performed at a temperature of at least 800° C.

14. The process according to claim 3, wherein the feed for the first distillation step b) is a crude solder composition comprising at least 0.16% wt and optionally at most 10% wt of the total of chromium (Cr), manganese (Mn), vanadium (V), titanium (Ti), tungsten (W), copper (Cu), nickel (Ni), iron (Fe), aluminium (Al) and/or zinc (Zn), the feed for the first distillation step b) being available at a temperature of at least 500° C., the process further comprising the step of pre-treating the crude solder composition from step a) to form the solder mixture in the feed for the first distillation step b), the pre-treatment step comprising the steps of:
   cooling the crude solder composition down to a temperature of at most 825° C., to produce a bath containing a first supernatant dross which by gravity becomes floating upon a first liquid molten metal phase,
   adding a chemical selected from an alkali metal and/or an earth alkali metal, or a chemical compound comprising an alkali metal and/or an earth alkali metal, to the first liquid molten metal phase to form a bath containing a second supernatant dross which by gravity comes floating on top of a second liquid molten metal phase, and
   removing the second dross from the second liquid molten metal phase.

15. The process according to claim 3, wherein the solder mixture which is fed to the first distillation step b) comprises, on a weight basis;
- at least 90% of tin and lead together;
- more lead than tin;
- at most 0.1% of the total of chromium (Cr), manganese (Mn), vanadium (V), titanium (Ti), and tungsten (W);
- at most 0.1% of aluminium (Al);
- at most 0.1% of nickel (Ni);
- at most 0.1% of iron (Fe); and
- at most 0.1% of zinc (Zn).

16. The process according to claim 3, wherein the solder mixture which is fed to the first distillation step b) comprises, on a weight basis, at least 1 ppm wt and at most 5000 ppm wt of copper.

* * * * *

UNITED STATES PATENT AND TRADEMARK OFFICE
CERTIFICATE OF CORRECTION

PATENT NO. : 12,060,626 B2
APPLICATION NO. : 17/423465
DATED : August 13, 2024
INVENTOR(S) : B. Coletti et al.

Page 1 of 1

It is certified that error appears in the above-identified patent and that said Letters Patent is hereby corrected as shown below:

In the Claims

| Column | Line | |
| --- | --- | --- |
| 48 | 18 | change "0.0%" to -- 15.0% -- |

Signed and Sealed this
Twenty-fifth Day of February, 2025

Coke Morgan Stewart
*Acting Director of the United States Patent and Trademark Office*